United States Patent
Faulring

(10) Patent No.: US 6,634,306 B1
(45) Date of Patent: Oct. 21, 2003

(54) METHOD AND APPARATUS FOR TRANSPLANTING

(76) Inventor: Frank W. Faulring, 4841 Genesee Rd., North Collins, NY (US) 14111

(*) Notice: Subject to any disclaimer, the term of this patent is extended or adjusted under 35 U.S.C. 154(b) by 0 days.

(21) Appl. No.: 10/208,417

(22) Filed: Jul. 30, 2002

(51) Int. Cl.⁷ .............................................. A01C 11/02
(52) U.S. Cl. ....................... 111/105; 111/117; 111/900; 47/901
(58) Field of Search ................................ 111/105, 115, 111/117, 110, 101, 104, 106, 919, 95, 92, 93, 89, 900; 47/1.01 R, 1.01 T, 901

(56) References Cited

U.S. PATENT DOCUMENTS

| | | |
|---|---|---|
| 85,195 A | 12/1868 | Young |
| 120,801 A | 11/1871 | Waite |
| 3,446,164 A | 5/1969 | Huang et al. |
| 3,712,252 A | 1/1973 | Huang |
| 4,186,671 A | 2/1980 | Huang |
| 4,616,578 A | 10/1986 | Talbott |
| 4,770,111 A | 9/1988 | Heum |
| 4,941,416 A | 7/1990 | Faulring |
| 5,179,800 A | 1/1993 | Huang |
| 5,209,170 A | 5/1993 | Kobayashi |
| 5,241,917 A | 9/1993 | Ferrand |
| 5,431,116 A | 7/1995 | Gao |
| 5,445,089 A | 8/1995 | Houng et al. |
| 5,573,558 A | 11/1996 | Huang |

FOREIGN PATENT DOCUMENTS

| | | |
|---|---|---|
| AU | 662964 B | 9/1994 |
| CN | 11078847 | 12/1993 |

OTHER PUBLICATIONS

Huang, Increase Crop Production and Automation Using Properly Designed Air–pruning Trays/Containers, Agricultural Mechanization in Asia, Africa and Latin America, 1998, pp. 42–50, vol. 29, No. 2.
Renaldo Sales & Services, Inc., Posi–Flow Planting System for Plastic Mulch, Semi–Automatic Transplanter, Owners Manual, Jun. 2001 or earlier.

*Primary Examiner*—Christopher J. Novosad
(74) *Attorney, Agent, or Firm*—John C. Thompson

(57) ABSTRACT

A transplanter is provided a single centralized pneumatic feeder which will feed anywhere from 2 to 10 or more rows of seedlings at one time. The centralized pneumatic feeder concept allows the transplanter to operate with low velocity movement and still plant large numbers of seedlings. The seedlings are initially in plant trays designed so that the seedlings can be extracted from the bottom of the trays. To simplify seedling transfer, the pneumatic feeder includes an impulse-type extraction system and a pneumatic seedling transfer system is employed. This new system is simple in concept and has only two moving parts per row. This concept makes the transplanter system extremely adaptable to almost any configuration, for example 2–10 or more rows, bare ground fields, mulch covered beds, and even other manufacturer's planters. The transplanter is equipped with a full tray magazine and an empty tray magazine to either side of a seedling support, which avoids the necessity of stopping the unit when one or two trays have been emptied.

11 Claims, 21 Drawing Sheets

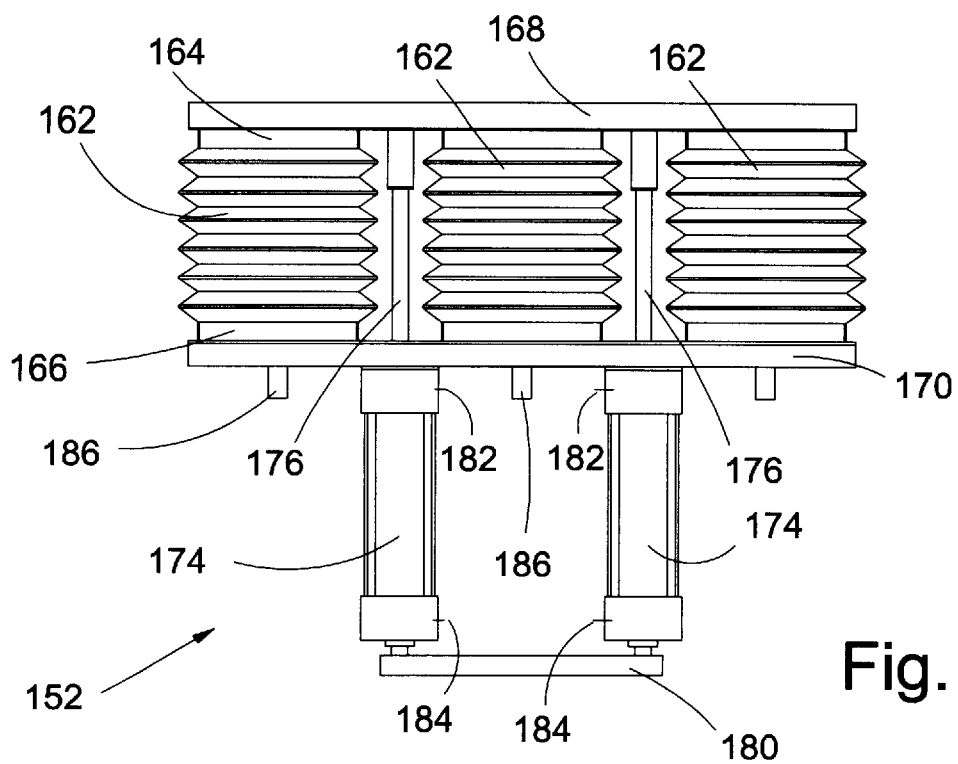
Fig. 12A
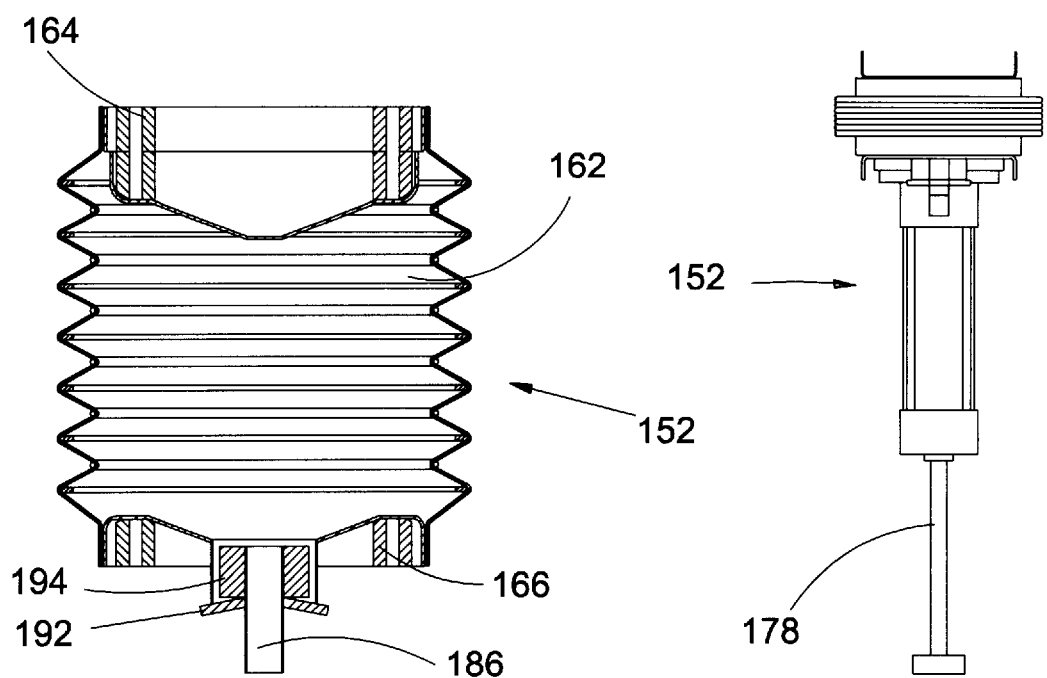
Fig. 13
Fig. 12B

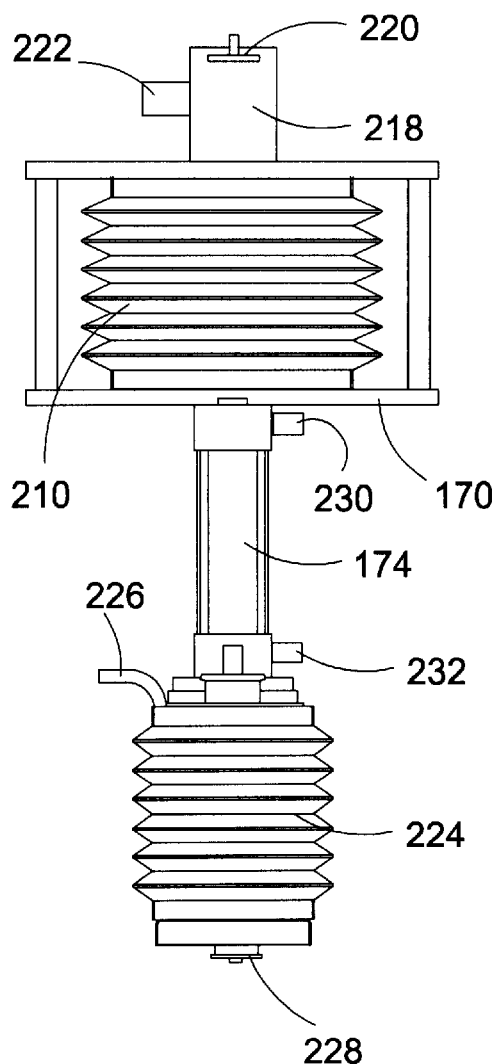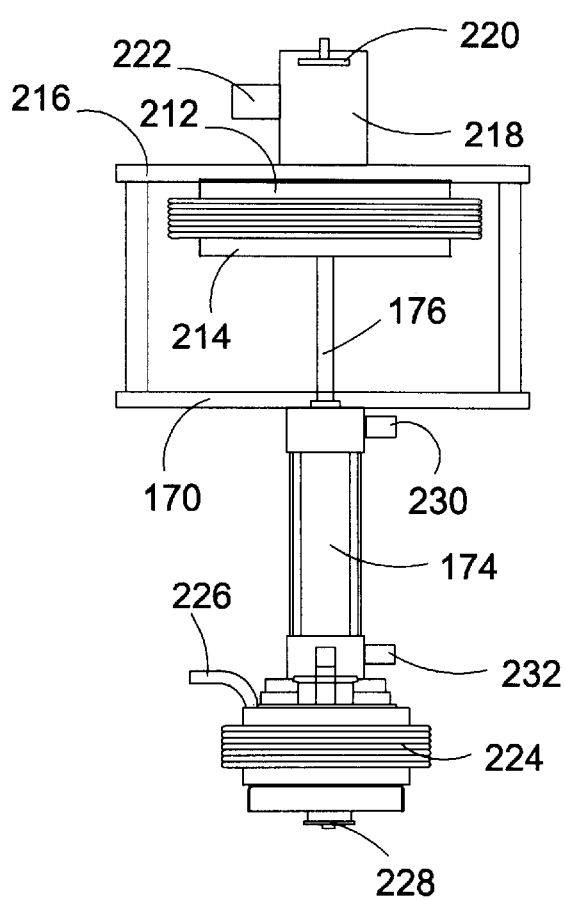
Fig. 15A
Fig. 15B

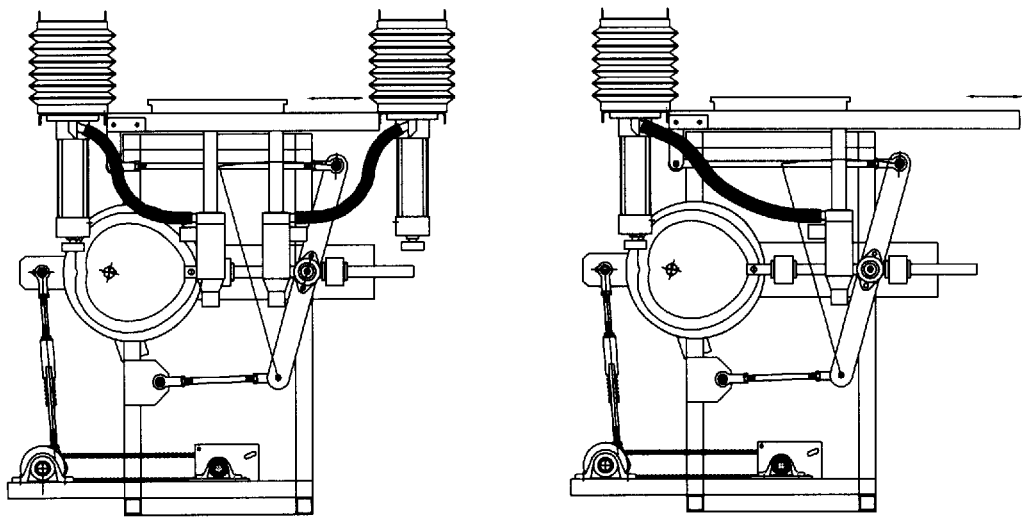
Fig. 19A  Fig. 18A
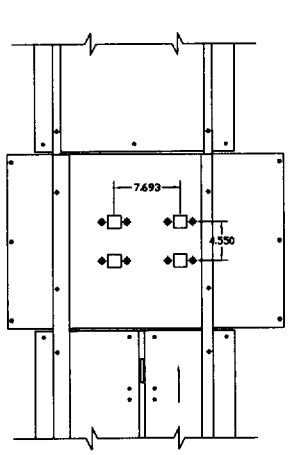
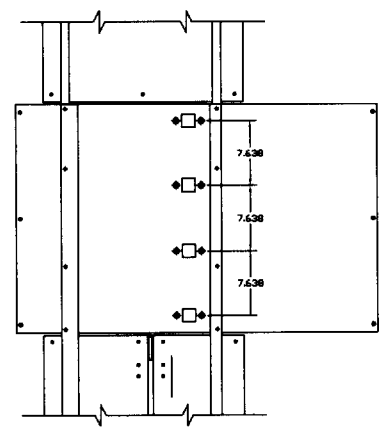
Fig. 19B  Fig. 18B

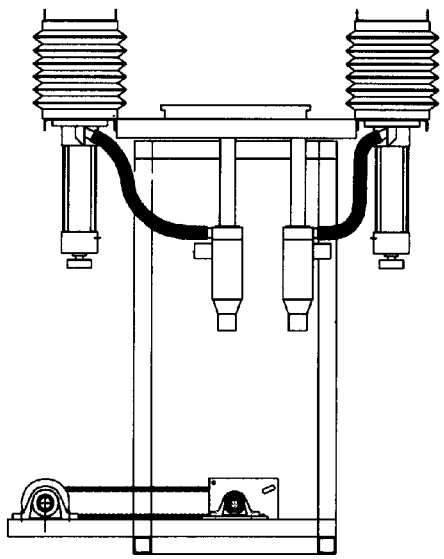
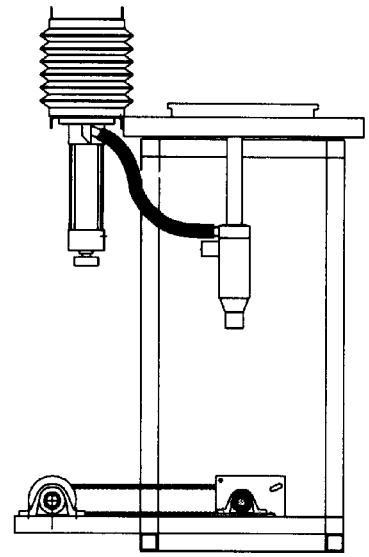
Fig. 23A
Fig. 22A
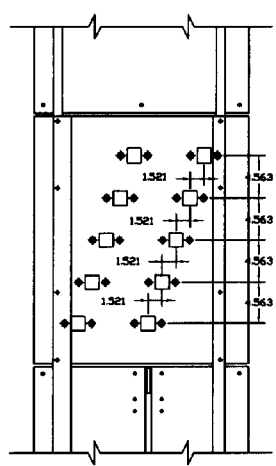
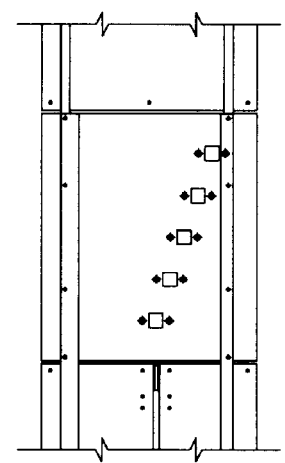
Fig. 23B
Fig. 22B

METHOD AND APPARATUS FOR TRANSPLANTING

TECHNICAL FIELD

The present invention relates generally to agricultural equipment, and more particularly to a simple and effective method and apparatus capable of simultaneously transplanting a plurality of seedlings from a centralized location to a plurality of spaced apart rows.

BACKGROUND OF THE INVENTION

The transplanting of seedlings is virtually as old as farming. Initially transplanting was accomplished manually, with the farm worker digging a hole in the ground and then placing the seedling in the hole. However, efforts have been made to mechanize this agricultural activity, early activities being illustrated in U.S. Pat. No. 85,195 issued Dec. 22, 1868 and U.S. Pat. No. 120,801 issued Nov. 7, 1871. In U.S. Pat. No. 85,195 the seedlings to be planted are placed on a belt of a horse drawn transplanter, the transplanter including means to open and close a furrow in the ground. The seedlings to be transplanted are picked up roots first from the endless belt by a setting wheel, and are then set in the furrow in a vertical position with their roots down. U.S. Pat. No. 120,801 shows that the seedlings to be transplanted may pass by gravity through a pipe or tube.

While early transplanters were drawn by draft animals, transplanting equipment today is either self-propelled, or, more commonly, drawn by tractors. U.S. Pat. No. 3,446,164 to Huang et al issued May 27, 1969 discloses an automatic two row transplanter. This device as illustrated discloses a tractor drawn carrier, although it is disclosed that it may be self-propelled. The Huang et al transplanter includes, in addition to furrow openers and press wheels for each row, two pairs of drop tubes, there being one pair of drop tubes for each row. A vacuum source is connected to each drop tube so that a vacuum may be applied thereto. The seedlings to be transplanted are carried in grid trays which rest upon a grid bearing plate of the transplanter. The grid bearing plate is provided with apertures, there being one pair of apertures for each pair of drop tubes. During operation, only one grid tray is associated with each pair of apertures. Thus, there is one tray for each row. A first indexing mechanism is provided to control longitudinal movement of the grid bearing plate and a second indexing mechanism is provided to control transverse movement of the grid trays so that in turn each seedling in each tray will move over the apertures and be drawn into the drop tubes by the applied vacuum and then pass therethrough. The drop tubes are provided with one way valves below the vacuum source. The potted seedlings pass through the one way valves, which valves prevent reverse air flow to the vacuum source. Once the seedlings have passed the one way valves in the drop tubes, inertia and gravity will cause them to continue their movement towards and into open furrows. Once the grid trays on the transplanter are empty, the transplanting cycle has been completed, and the transplanter must be stopped and the grid trays reloaded. After this is accomplished the transplanting operation can commence for another cycle. Other related Huang patents are U.S. Pat. No. 3,712,252, U.S. Pat. No. 4,186,671, and U.S. Pat. No. 5,254,140.

Huang also discloses that it is desirable to transplant plants having air-pruned root systems. Many papers have been written about air-pruning one of which is "Increase Crop Production and Automation Using Properly Designed Air-pruning Trays/Containers" (Agricultural Mechanization in Asia, Africa and Latin America, Vol. 29, No. 2, pp. 42–50 (1998). Related patents and published applications which disclose apparatus for planting air-pruned plants are U.S. Pat. No. 5,179,800, U.S. Pat. No. 5,254,140, CN 1,078,847, U.S. Pat. No. 5,431,116, AU 662,964, and U.S. Pat. No. 5,573,558. The apparatus disclosed in these various patents all use essentially the same concepts discloses in U.S. Pat. No. 3,446,164, and have the same basic disadvantages of U.S. Pat. No. 3,446,164. Thus, the seedlings which are to be discharged are not positively handled once they pass the source of vacuum within the discharge tube.

This requires that the number of components and moving parts for feeding the plants to be multiplied by the number of rows, thus resulting in high initial cost and operating maintenance costs. To perform the indexing of the tray and plant extraction, most of the previous systems utilized sensors, servos and computers. In the environment planters operate in, electronic sophistication quickly becomes an on-going maintenance problems. Because of this sophistication, highly trained and expensive labor is needed to keep the planters running. In addition, the prior apparatus requires that the planting unit be stopped once the grid trays on the transplanter are empty. Physical size of the indexers and planter components limit the adaptability of the planter to be set up for differing regional needs. Furthermore, physical limitations, as to how fast the system can run without component damage and transplant damage, has many times reduced the potential labor savings and economic benefit of an automatic planter.

Other patents which are conceptually similar to U.S. Pat. No. 3,446,164 are U.S. Pat. Nos. 4,770,111, 5,209,170, 5,241,917, and 5,445,089. Another transplanter is shown in U.S. Pat. No. 4,941,416. However, none of these patents overcome the disadvantages of U.S. Pat. No. 3,446,164 set forth above.

OBJECTS AND SUMMARY OF THE INVENTION

It is an object of the present invention to provide a transplanter employing a novel method and apparatus of transplanting which overcomes many of the disadvantages of the prior art.

More particularly, it is an object of the present invention to provide a transplanter which is capable of transplanting seedlings to a plurality of transversely spaced apart rows from a single centralized source of seedlings.

It is a further object of the present invention to provide a transplanter in which seedlings are transported from a common source initially under negative air pressure to an intermediate ejector chamber, and then under positive air pressure to the ground to insure positive handling of the seedlings.

Another object of the present invention is to provide a pneumatic plant transfer system and seedling tray support design which can be readily modified, so that seedlings to be transplanted can be planted in a selected number of rows at the same time, such as two rows, three rows as illustrated in the accompanying figures, or more rows even up to 10 or more.

It is yet another object of the present invention to provide a transplanting apparatus which is of relative low cost and of high durability.

In summary, the present invention utilizes a single centralized feeder which will feed anywhere from 2 to 10 or more rows of seedlings at one time. The centralized feeder concept allows a machine to operate with low velocity movement and still plant large numbers of seedlings per hour (i.e. 10,400 per 2 row unit and 54,000 per 10 row unit). The present invention utilizes open bottom plant trays provided with air pruned type seedlings. These plant trays are designed so that the seedlings can be extracted from the bottom of the trays, seedlings for all rows being extracted from a single tray, or during a transition from one leading tray to another following tray, from two adjacent trays. The tray s are supported on a support which is in turn carried by a carrier which is adapted to be propelled in a forward direction across the ground which is to receive the seedlings. The carrier in the illustrated embodiment is a tractor drawn tool bar. The carrier also carries a plurality of transversely spaced apart soil openers for creating seedling receiving openings in the ground. Means are provided for transporting the seedlings from the centralized feeder to the opened ground, the transport means including an impulse-type extraction system and a pneumatic seedling transfer system. This new system is simple in concept and has only two moving parts per row. The real merit of the concept is its ability to extract seedlings from a centralized feeder and transfer the seedlings to individual row units through conduit tubes, one per row. To minimize sophistication, the "X" and "Y" movements of the indexer utilize a simple mechanical cam, ratchet, and eccentric design. Low velocity movement of the mechanical components result in a system with much more durability and longevity. This concept makes the transplanter system extremely adaptable to almost any configuration, for example 2–10 or more rows, bare ground fields, mulch covered beds, and even to other manufacturer's planters. The transplanter is equipped with a full tray magazine and an empty tray magazine to either side of a longitudinally movable cross table. In order avoid the necessity of stopping, and to insure that all seedlings in a tray are utilized, before one full tray has been completely emptied, a full tray is transferred from the full tray magazine to the indexer behind the tray being emptied so that it can be fed with the almost emptied leading tray, and when the leading tray has completed its movement across the cross table, the emptied leading tray is transferred to the empty tray magazine. This avoids the necessity of stopping the unit when one or two trays have been emptied.

The above objects, and other objects and advantages of the present invention will become more apparent after a consideration of the following detailed description taken in conjunction with the accompanying drawings which show preferred forms of this invention.

BRIEF DESCRIPTION OF THE DRAWINGS

FIGS. 12A and 12B illustrate the operation of the bellows type impulse generator.

FIG. 13 is a section through the bellows type impulse generator.

FIGS. 15A and 15B show an alternative design of an apparatus for creating high vacuum on one stroke of a double rodded cylinder, and high volume low pressure air on the other stroke of the double rodded cylinder.

FIGS. 17A–23B show the designs of indexing mechanism for transplanters having row configurations other than three rows.

DETAILED DESCRIPTION IN GENERAL

With reference first to FIGS. 1 to 4, a three row transplanting apparatus of this invention is indicated generally at 10. It is adapted to be drawn over the ground by a tractor indicated generally at T in FIG. 1A. To this end, the transplanting apparatus includes a carrier in the form of a tool bar 11. The tool bar 11 is connected to the tractor by a conventional hitch. It is further supported during transplanting by a pair of left and right ground wheels 12L and 12R, respectively, one of which is the transplanter drive wheel. (Left and right reference is determined by standing to the rear of the transplanter and facing its direction of travel.)

Figure 5:
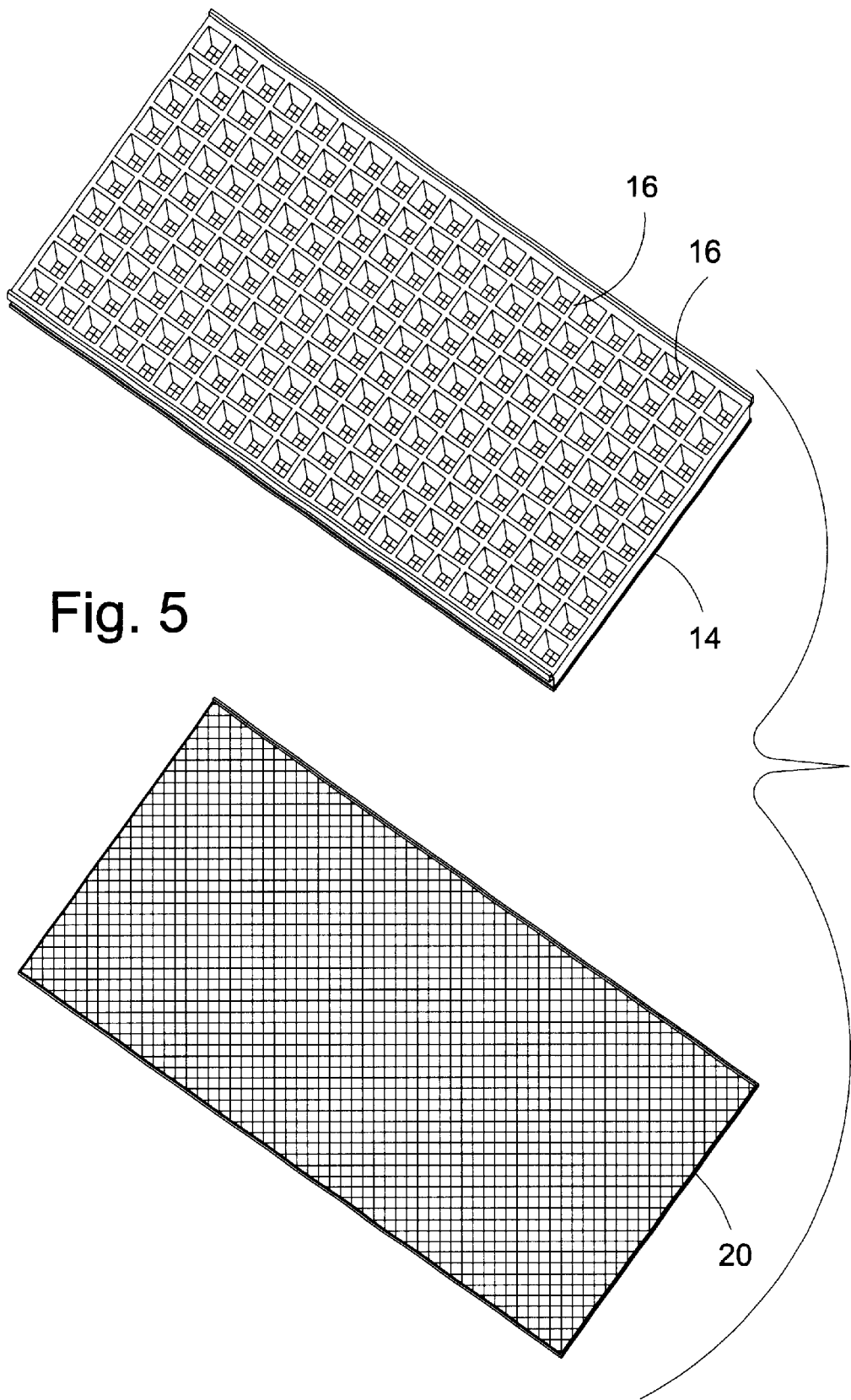
FIG. 5 is a perspective view of a plant tray system suitable for use with the transplanter of this invention, with a detachable screen being shown spaced away from the plant tray.
Figure 6:
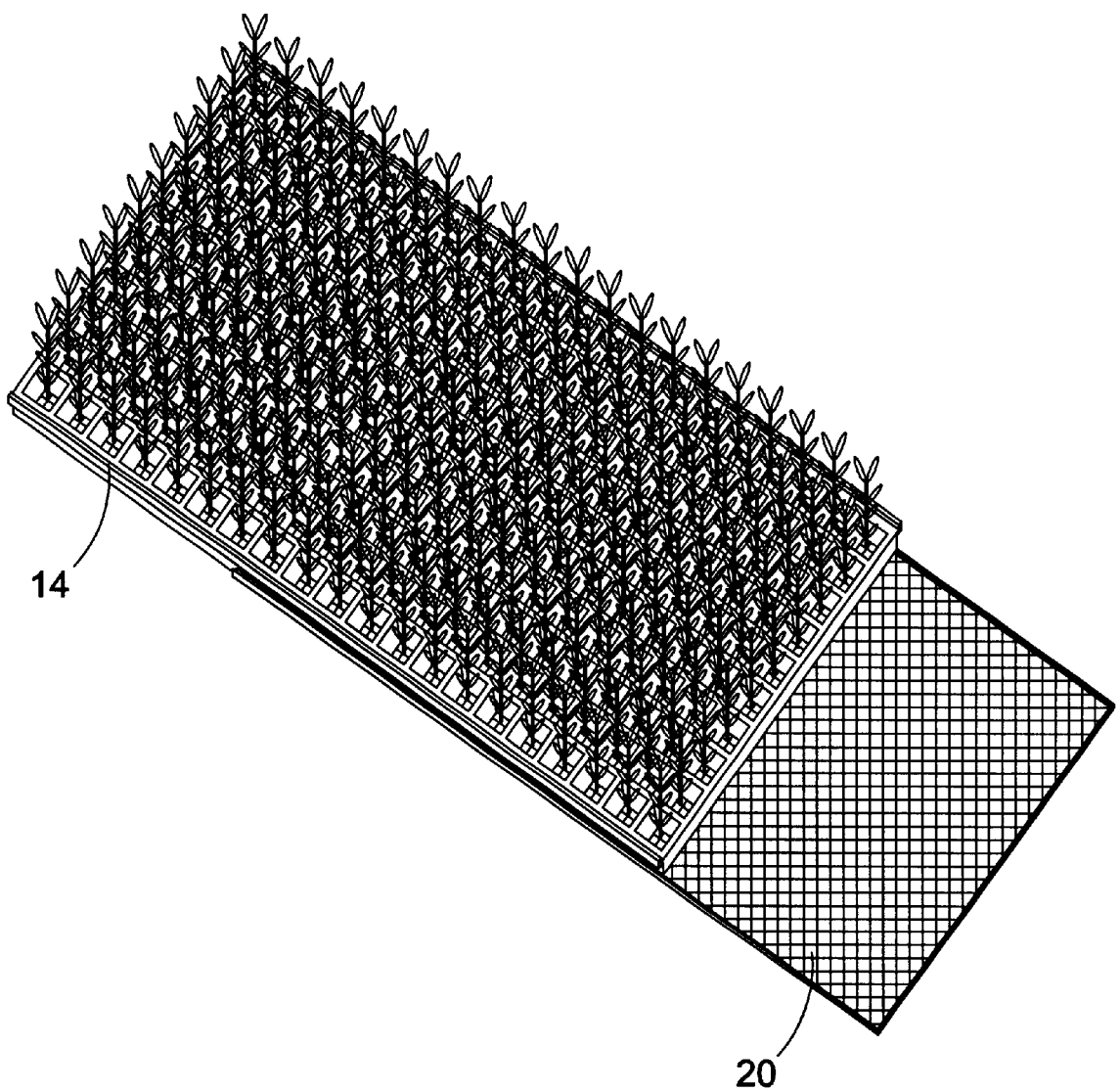
FIG. 6 is a perspective view of a plant tray system in which seedlings have been grown, the detachable screen being shown partially removed.
Figure 6A:
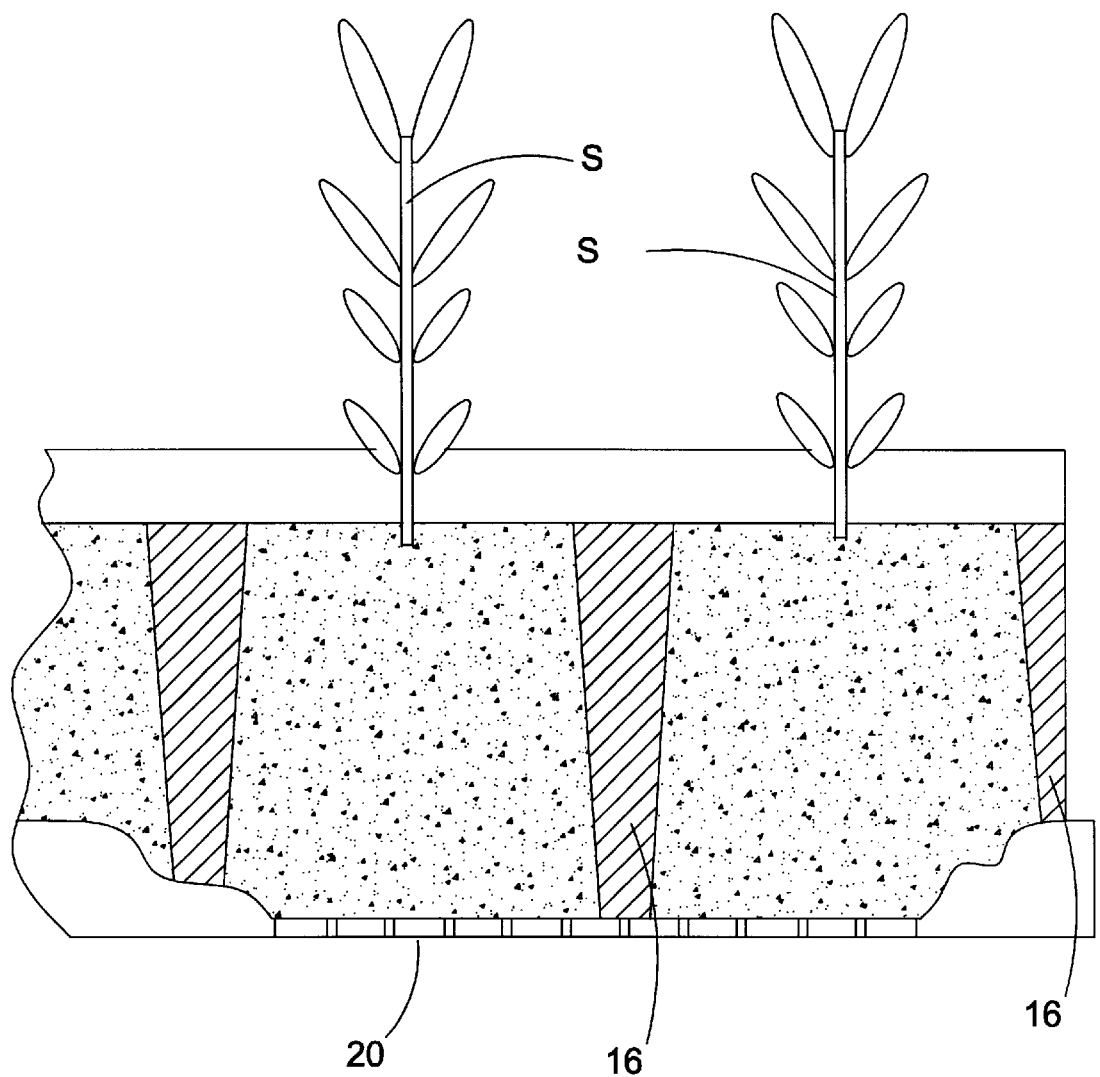
FIG. 6A is a fragmentary view of the plant tray system, portions of the detachable section being broken away to better illustrate the screen which is used during growing of the seedlings.

The transplanter apparatus as illustrated is designed to use air-pruned seedlings which, prior to being planted, are supported in open bottom plant trays shown generally at 14 in FIG. 5. The trays have a plurality of longitudinally and transversely extending walls 16 which define cells (no number), which cells contain seedlings S. As can be seen from FIG. 6A, each cell is slightly smaller at the top than at the bottom, which design facilitates the removal of seedlings from the bottom of the trays. A removable screen 20 is provided below each tray to support soil and the seedlings as they are initially grown prior to transplanting. While a preferred design of open bottom plant tray is shown, other designs of the trays can be seen in various Huang patent, for example AU 662964.

In accordance with this invention, a plant tray support is provided on the carrier, which support includes a plant tray bearing plate 22. The plate is provided with suitable apertures 24 in communication with means for transporting the seedlings to the ground. In the embodiment shown in FIG. 8, the plate is provided with three apertures 24, one for each row that is to receive seedlings, and the plate has drop tubes 26 connected thereto, one drop tube for each aperture. An indexing mechanism, indicated generally at 28 in FIG. 9, is provided to control longitudinal movement of the plant tray bearing plate 22. Another indexing mechanism, indicated generally at 29 in FIG. 7A, is employed to impart transverse movement to the trays 14. The two indexing mechanisms insure that in turn each seedling in each tray will move over the drop tubes and pass therethrough and, with the assistance of the seedling transport means, into the open furrows. In addition to the plant tray bearing plate 22, there are right and left stationary tray supports 30, 31, respectively, which are spaced to the opposite sides of the bearing plate 22. In addition, front and rear guide rails 32, 33, are provided, which will insure only transverse movement of the trays during operation.

The planter is equipped with a magazine 34 for full trays and a further magazine, the bottom being shown at 36. When one tray 14 on the grid bearing plate 22 has been completely emptied, the emptied tray is indexed onto the left tray support 31, and is then manually transferred to an empty slot in a magazine by an operator O. Before a tray is completely emptied, the operator O will pick up a full tray from the full tray magazine 34, remove the removable screen, and place the full tray onto the table 30 in abutting relationship to the tray which is being emptied. This operation will be described in greater detail below.

THE BARE GROUND UNIT

Figure 1:
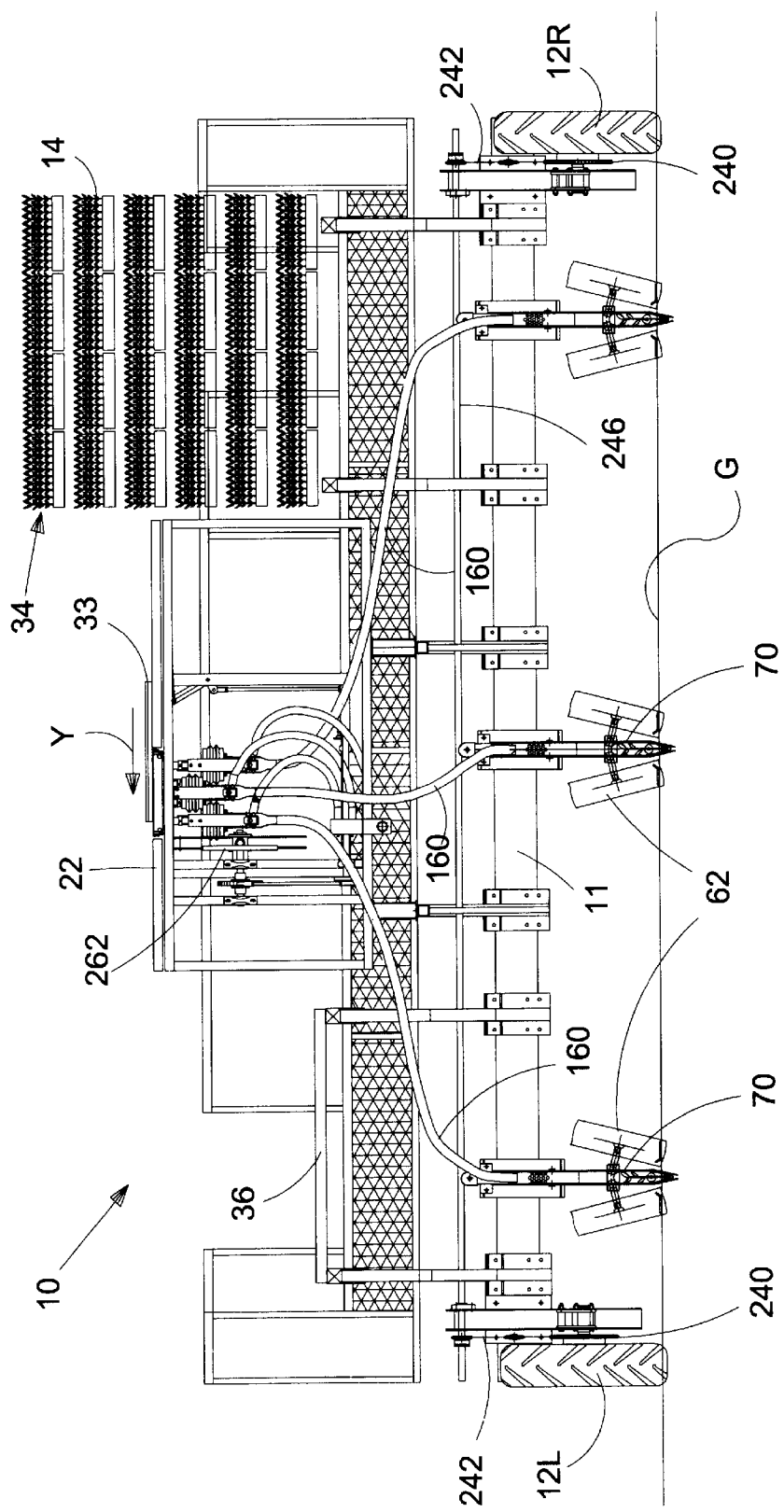
FIG. 1 is a rear view of a three row bare ground transplanter assembly incorporating this invention.
Figure 1A:
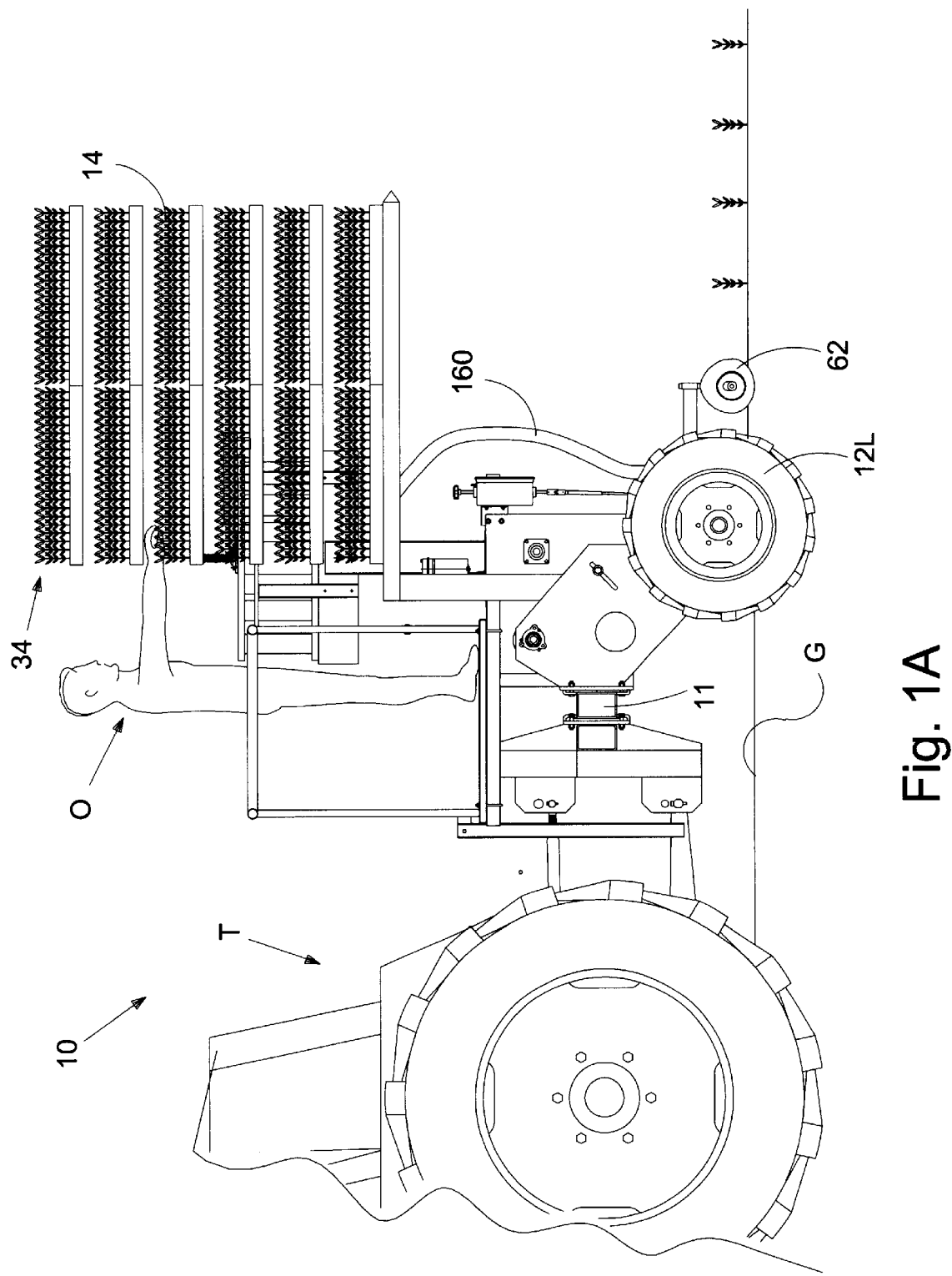
FIG. 1A is a side view of the transplanter shown in FIG. 3.
Figure 2:
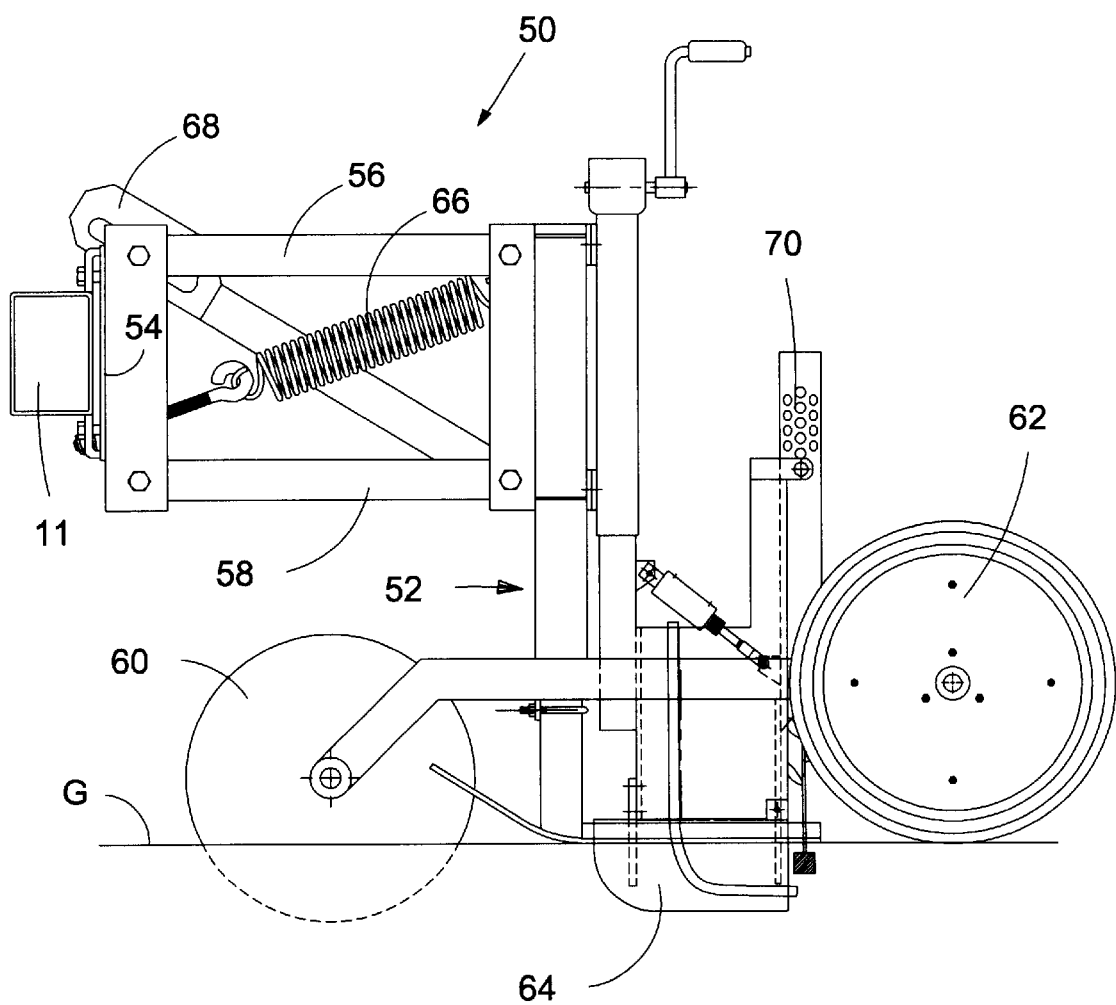
FIG. 2 is an enlarged side view of a one row bare ground unit which is shown in FIG. 1.

As noted before, the transplanter system of this invention is very versatile, being adaptable to almost any configuration, for example bare ground fields or mulch covered beds. FIGS. 1–2 show a transplanter adapted to bare ground G. It is necessary to provide a plurality of spaced apart soil openers for creating seedling receiving openings in the ground G. Thus, a ground unit is provided for each transversely spaced apart row which is to receive seedlings, a bare ground unit being shown in FIG. 2, the bare ground unit being indicated generally at 50. The bare ground unit includes a unit frame subassembly 52 secured to the tool bar 11 by a parallel linkage. The parallel linkage includes a forward tool bar mounting plate 54 which is secured to the tool bar 11 in a manner not material to the present invention, and upper and lower links 56, 58, respectively, the unit frame subassembly 52 being secured to the rear ends of the parallel links. (Upper and lower reference is determined from the orientation shown in the drawings, and forward and rear reference is determined by direction of travel of the transplanter.) Supported on the lower end of the unit frame subassembly 52 is a ground engaging subassembly including a coulter 60, packer wheels 62, and an opener shoe 64. Proper down pressure is maintained during operation by down pressure spring 66. Control link 68 keeps the ground engaging assembly under control when the tool bar 11 is raised. A portion of the seedling transfer means (which will be described in detail below) includes tubular member 70 which is carried to the rear of the unit frame subassembly 52. The bare ground unit is generally conventional and therefore will not be described further as its construction should be well known to those skilled in the art.

THE MULCH TYPE GROUND UNIT

Figure 3:
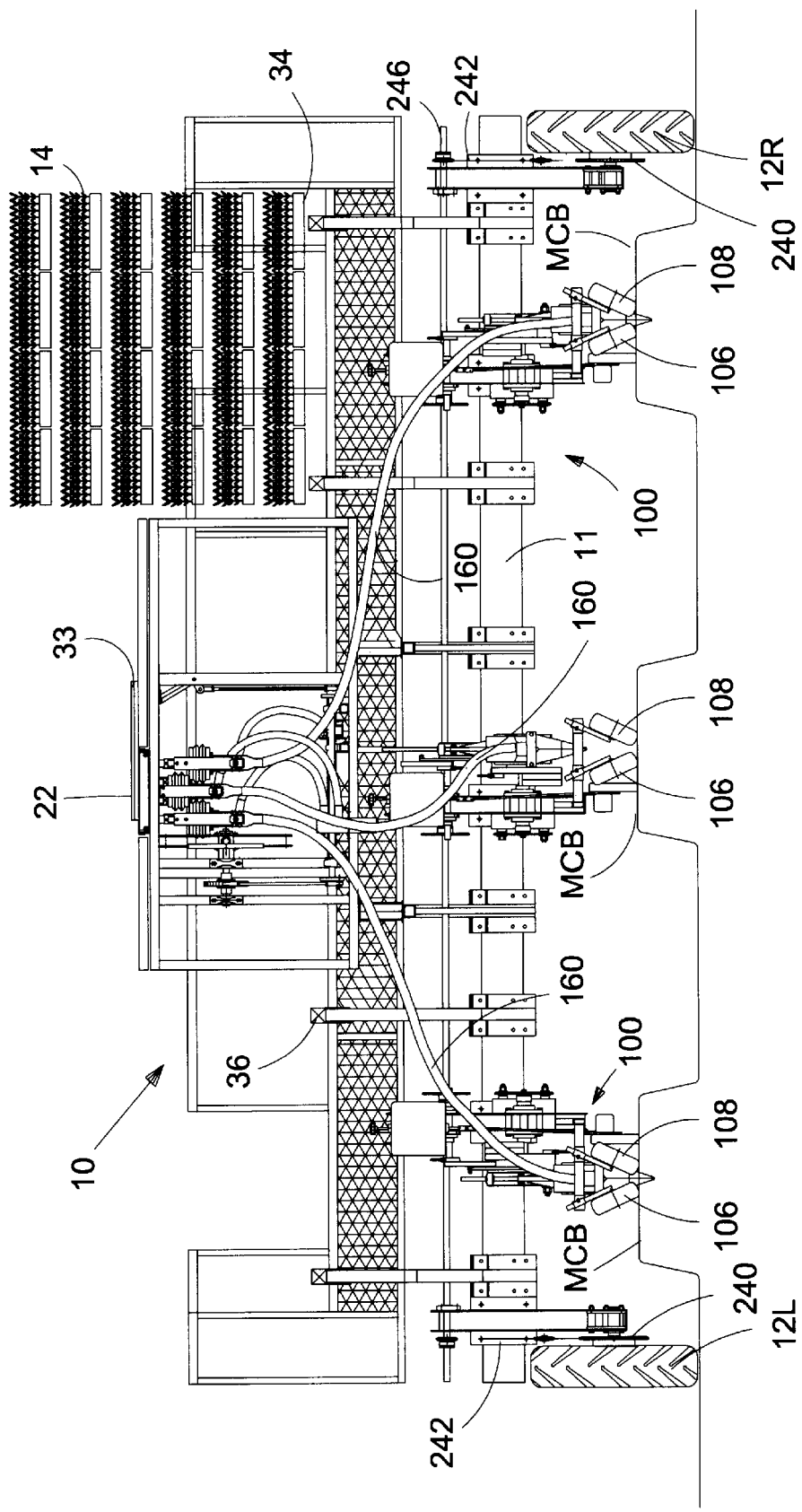
FIG. 3 is a rear view of a three row unit similar to that shown in FIG. 1, this unit being designed for mulch bed planting.
Figure 4:
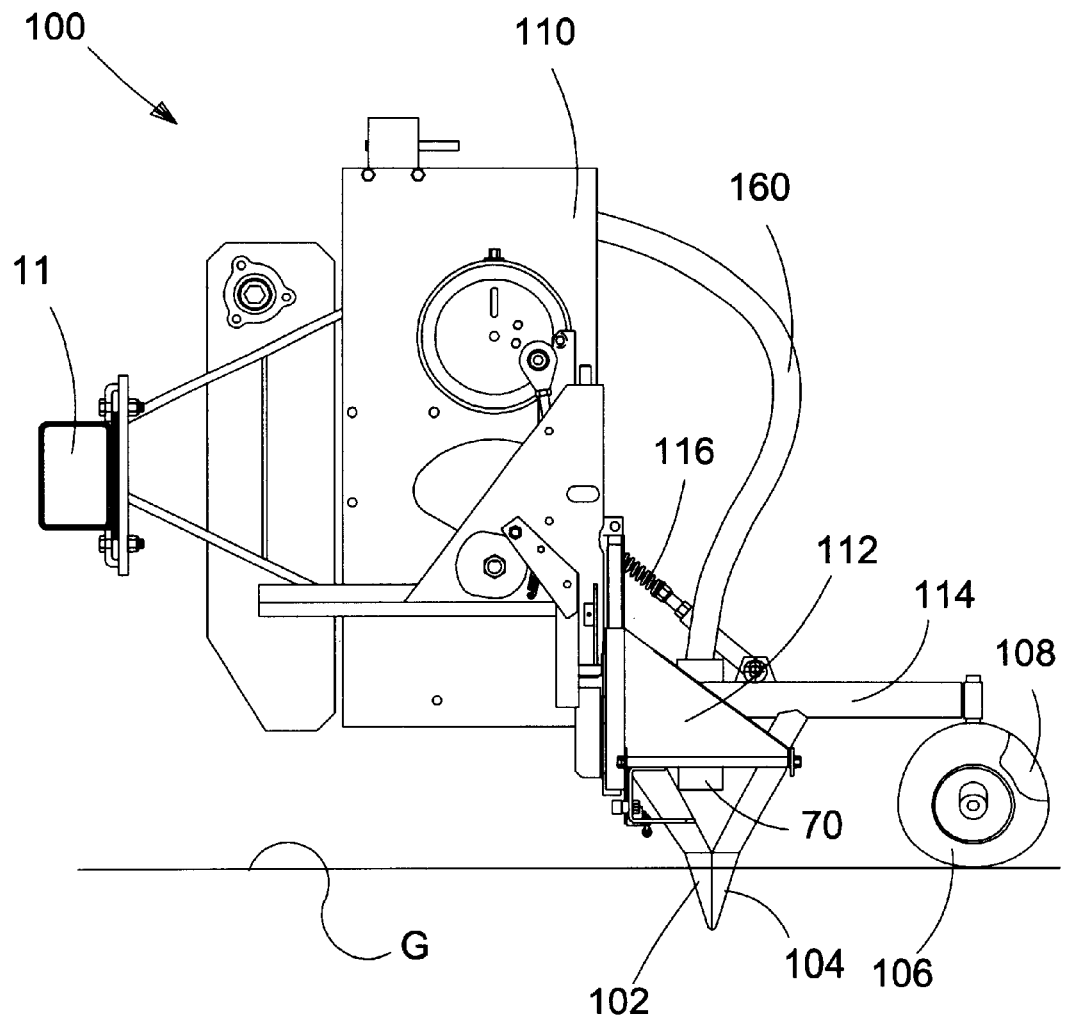
FIG. 4 is an enlarged side view of a single much unit shown in FIG. 3.

In FIGS. 3–4 a transplanter is shown which is adapted to mulch covered beds MCB. Each of the ground units for mulch cover beds includes well known components and therefore will be described in detail. However, it should be noted that the ground units for mulch covered beds, which are indicated generally at 100, are mounted on the tool bar 11 in a conventional manner. The mulch type ground unit includes a burner (not shown) which is similar to the burner shown in U.S. Pat. No. 4,941,416. The purpose of the burner is to form an opening in the plastic mulch which covers the bed. In addition, each mulch type ground unit includes a pair of opposed clam shell jaws 102, 104 which are operated to move to an open position when in the ground to open the ground for the receipt of a seedling, and are then withdrawn from the ground and moved to a closed position after the seedling has been received in the opening in the row. Each mulch type ground unit further includes a pair of press wheels 106, 108, best seen in FIG. 3, which are for the purpose of closing the ground after the seedling has been received in the opening in the row. The jaws 102, 104 are carried by a vertically shiftable subframe 112 which may be moved up and down relative to main frame 110 in timed relationship to the planting of seedlings. In addition, the packer wheels 106, 108 are carried by a pivoted subframe 114, proper down pressure being exerted by spring 116. As the mechanism shown in FIG. 4 is well known to those skilled in the art, it will not be described further, other than to note that a plant transfer tube 160, which is part of the means for transporting the seedlings from the trays to the ground, has it downstream end positioned above tubular member 70 which is carried above the jaws 102, 104.

THE PLANT EJECTOR SYSTEM

Figure 9:
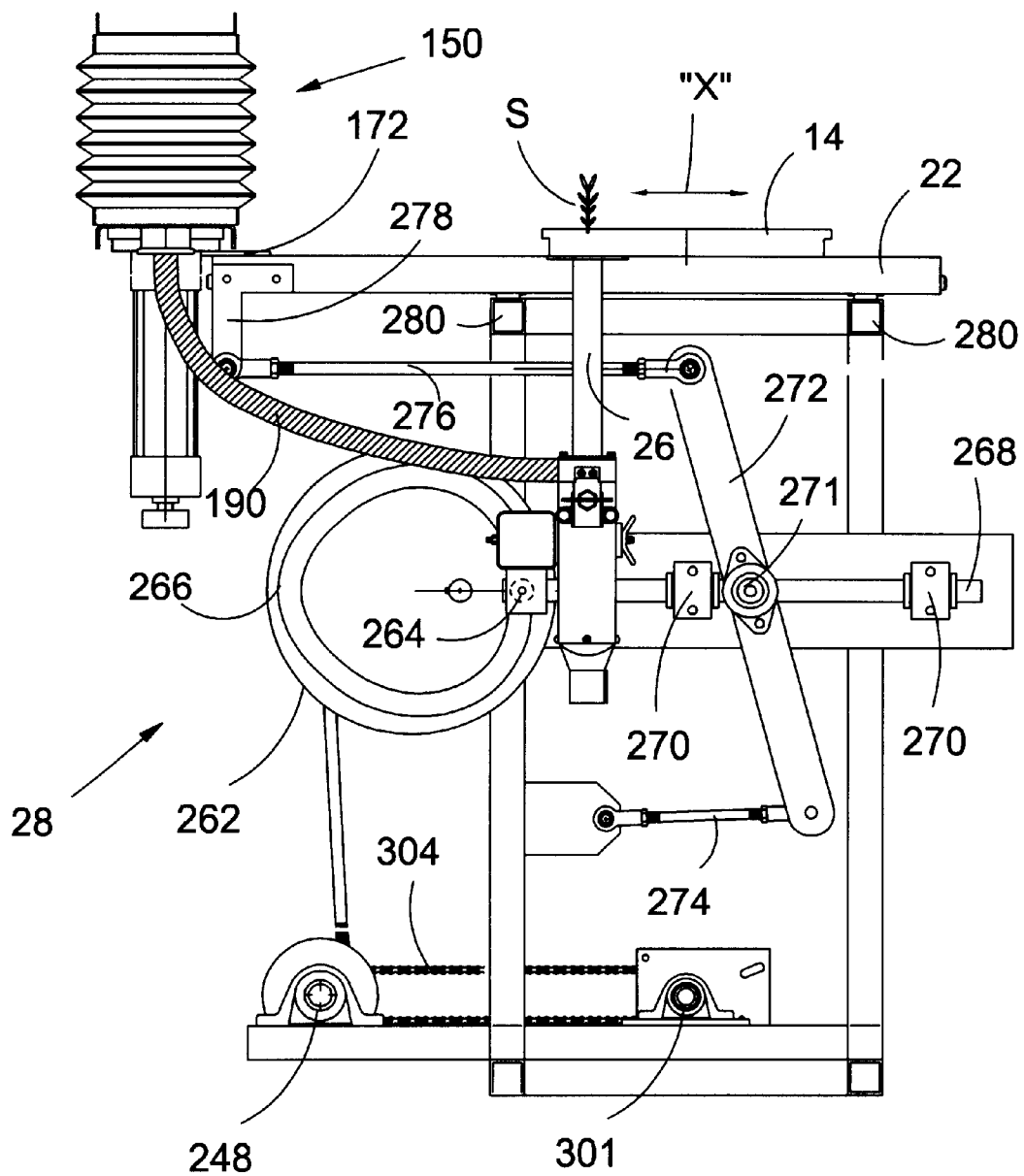
FIG. 9 is a further side view of FIG. 8 showing the cam for the "X" movement indexing mechanism.
Figure 10:
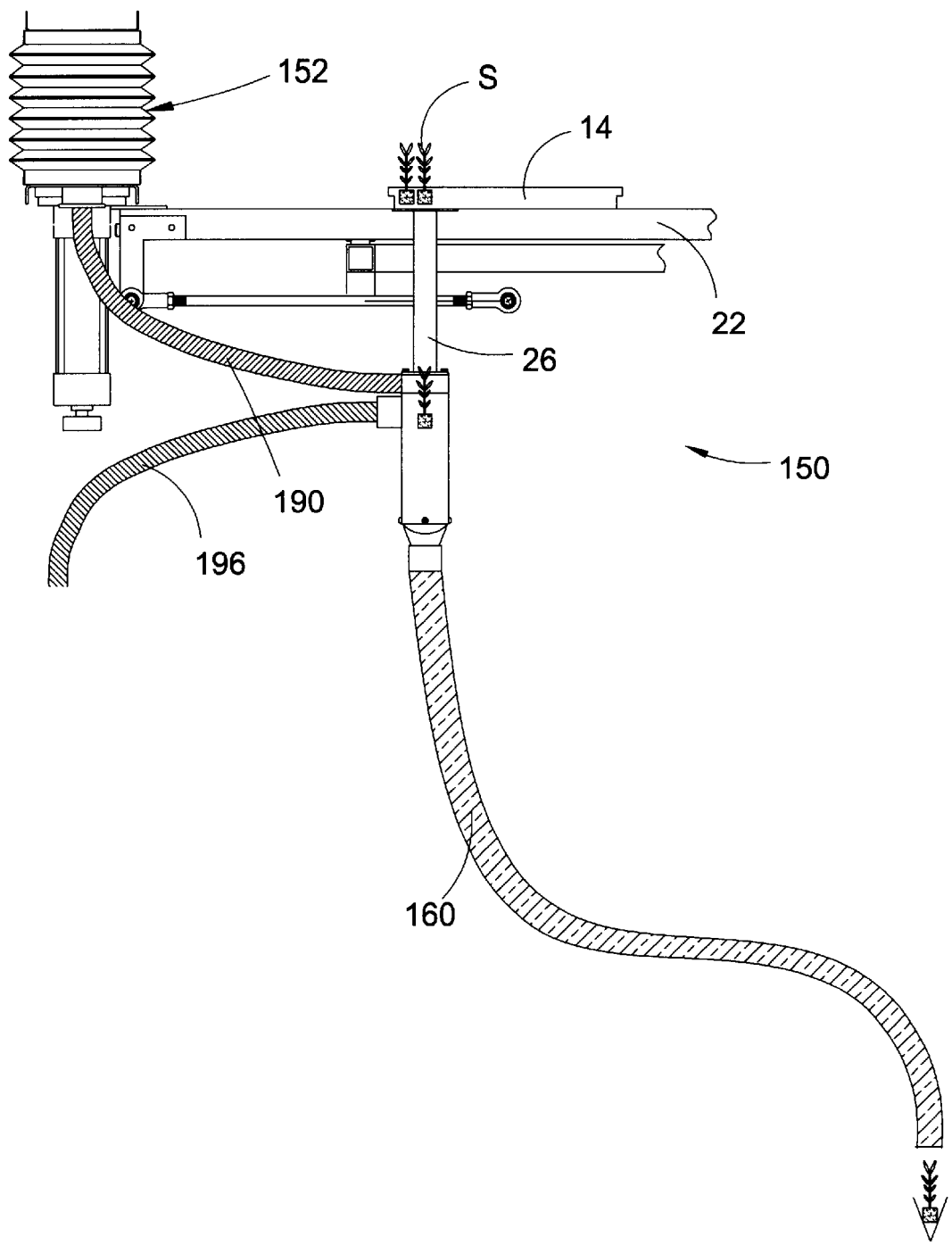
FIG. 10 is a side view of the pneumatic plant transfer system which may be employed in either the bare ground units of FIG. 1 or the mulch units of FIG. 3.

The means for transporting the seedlings, or the plant ejector system, is indicated generally at 150 in FIG. 10. The plant ejector system for each row includes a tubular passageway including a drop tube 26, a lower impulse chamber 154 (FIG. 11), which has a check valve 156 at its lower end, a transfer air chamber 158, and a plant transfer tube 160, the downstream or distal end of which may be connected to a tubular member 70 of a ground unit. Each of the drop tubes 26 may also be referred to as an upper impulse chamber, and the check valve may also be referred to as a birds mouth valve. The lower impulse chamber 154 and transfer air chamber 158 may also be referred to as an intermediate ejector chamber. In addition to the tubular passageway 26, 154, 158, 160 and 70, the plant ejector system also includes a source of high pressure negative impulse vacuum which in the embodiment shown in FIGS. 9–13 is indicated generally at 152, and a source of high volume low pressure air to be described later.

Figure 11:
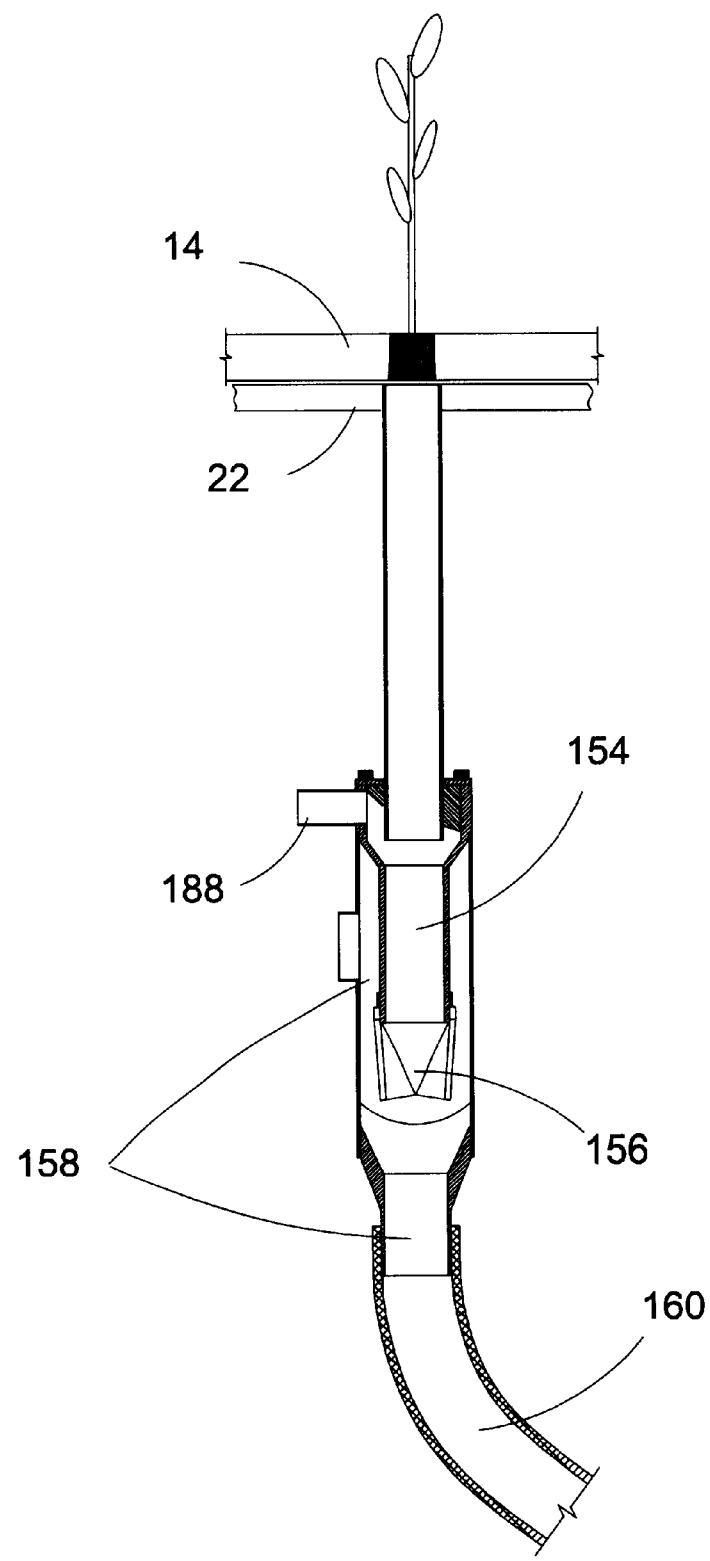
FIG. 11 is an enlarged fragmentary view of the structure shown in FIG. 10, parts being partially shown in section.

With further reference to FIGS. 9 and 11, in operation, the grid bearing plate 22 is positioned in a manner to be described below so that an aperture and drop tube 26 is directly below a seedling carrying cell as shown in FIGS. 9 and 11. A high negative impulse vacuum is applied to the bottom surface of the seedling. The high vacuum breaks the static seal of the root zone to tray, and the volume of negative air pulls the seedling into the drop tube 26. This action preferably takes place in less than ¹/₁₀ of a second. After the vacuum drops off, inertia and gravity act on the seedling to propel it into and through the lower impulse chamber 154. The root zone cube creates a certain level of displaced air ahead of its movement through the lower impulse chamber. This action pushes open the birds-mouth valve 156 allowing the seedling to pass through. After the seedling clears the birds-mouth valve ¹/₁₀–²/₁₀ seconds later, high volume positive low pressure air is applied to the lower transfer chamber 158. The high volume air pushes the transplant down the transfer tube 160 to seedling receiving tube 70 of the individual row.

The source of high pressure negative impulse vacuum 152 is best shown in FIG. 12A as well as in FIGS. 12B and 13. For a three-row planter, three expansion bellows 162 are employed. (For other row configurations, it is preferred that one bellows be employed per row). Each of the bellows is provided with upper and lower mounting hardware 164, 166, respectively, which may be secured to upper and lower platens 168, 170. The upper mounting hardware 164 is secured to the upper platen 168 by bolts or in any other conventional manner. Similarly, the lower mounting hardware 166 is secured to the lower platen 170 in a like manner. The lower platen 170 is in turn secured to the grid bearing plate 22 by means of a bracket 172, shown in FIG. 9.

In order to operate the bellows 162, a pair of double-acting air cylinders 174 are provided, each cylinder having an upper rod 176 and a lower rod 178. The upper end of each of the cylinders 174 is rigidly secured to the lower platen 170. The upper rods 176 pass through suitable apertures in the lower platen 170 and are rigidly secured to the upper platen 178 in any conventional manner. The lower rods 178 are connected to a lower cylinder rod tie mount 180. When the air is introduced into the upper ports 182 of the cylinders 174, the rods 176 will be moved downwardly compressing the bellows 162 as shown in FIG. 12B. Alternatively, when air is introduced into the lower port 184, the bellows will be expanded to the position shown in FIG. 12A. It should be noted that a source of high volume high pressure air is preferably connected to the port 184 which will cause the bellows to move to their expanded position very quickly, for example in ¹/₁₀ of a second. When this occurs, a vacuum will be drawn through the vacuum port 186 which is, in turn, interconnected with a port 188 (FIG. 11) associated with the lower impulse chamber 154 by means of a flexible hose 190 (FIG. 9). Thus, when air is introduced into the lower ports 184 of the air cylinders 174, a vacuum will be quickly drawn causing the seedling to move down the drop tubes 26 in the manner indicated above. When the bellows are again moved to their collapsed position shown in FIG. 12B, air within the bellows 162 will move out through the check valve assembly which includes a rubber or rubber-like flapper valve 192 and an associated spider 194 (FIG. 13).

Figure 14B:
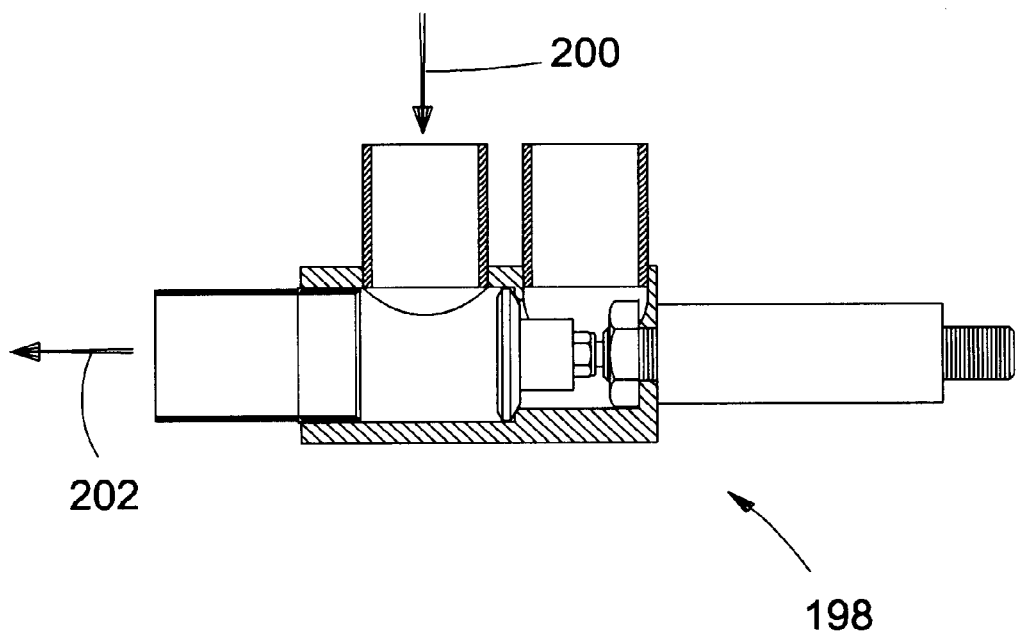
FIGS. 14A and 14B illustrate the low pressure pneumatic valve, FIG. 14A showing the position of the valve when high volume low pressure air is being directed to the lower transfer air chamber, and FIG. 14B showing the position of the valve when the high volume air is being sent to waste as when the valve at the bottom of the high vacuum chamber is open.
Figure 14A:
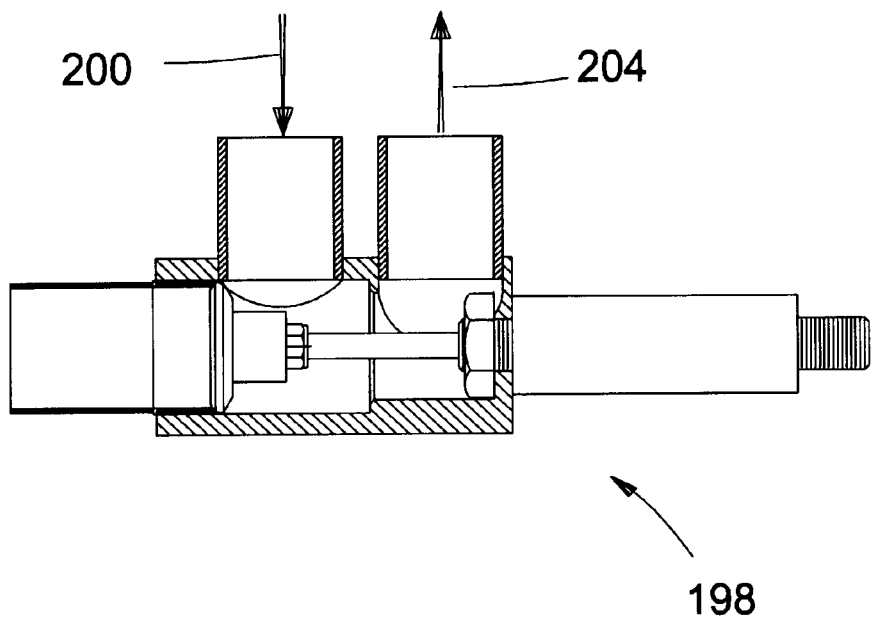

In the embodiment shown in FIGS. 9–13, the source of high volume, low pressure air may be a constantly running blower (not shown) which is connected to transfer air chamber 158 by means of a air line 196 (FIG. 10). As the blower is constantly running, it is necessary to provide a valve mechanism indicated generally at 198 in FIGS. 14A and 14B. This valve mechanism may be a conventionally operated solenoid valve. In one position, blower air indicated by arrow 200 is vented to atmosphere as indicated by arrow 202. When the valve in its other position as shown in FIG. 14A, high volume low pressure air is introduced through the port associated with arrow 200 and exits through the port associated with arrow 204 to the air line 196. As the valve shown in FIGS. 14A and 14B is of a conventional design, it will not be described further. However, it should be noted that the valve is in the position shown in FIG. 14B when the bellows 162 are being expanded to create a vacuum so that pressure in the intermediate ejector chamber 154, 158 is not influenced by the low pressure blower. However, the solenoid is caused to operate to move the valve to the position shown in FIG. 14A after the seedling S has passed through the birds mouth valve and is received within the transfer air chamber 158 to cause the seedling to be blown through the tube 160, drop tube 70 and into the open ground.

OTHER GENERATOR FOR VACUUM & TRANSFER AIR

An alternative mechanism for generating vacuum impulse and transfer air is shown FIGS. 15A and 15B. This design is in many respects similar to that shown in FIGS. 12A, 12B and 13, except that a second set of bellows 210 is employed for high volume low pressure air. In the design shown in FIGS. 15A and 15B, parts similar to the parts shown in FIGS. 9, 10, 12A, 12B and 13B will bear the same reference numerals. Thus, double acting air cylinders 174 are employed, only one being shown in FIGS. 15A and 15B. The cylinders are secured to a lower platen 170. The bellows 210 are provided with upper and lower mounting hardware 212, 214, respectively. The upper mounting hardware 212 is secured to upper platen 216 by bolts or by any other conventional manner. The upper piston rod 176 of piston 174 passes through a suitable aperture in the lower platen 170 and is secured to the lower mounting hardware 214 in a conventional manner. It should be appreciated that when the piston moves downwardly to the position shown in FIG. 15A, the bellows 210 will be expanded, and when moved upwardly to the platen shown in FIG. 15B, the bellows will be compressed. A valve 218, similar in function to the valve shown in FIGS. 14A and 14B, is mounted on the upper surface of the platen 216 in fluid communication with the interior of the bellows 210. When the bellows is moved downwardly from the position shown in FIG. 15B to the position shown in FIG. 15A air may flow into the bellows through the valve 218 and check valve 220. When the bellows is moved from the position shown in FIG. 15A to the position shown in FIG. 15B air will flow out of the port 222 which is in turn connected to a flexible tube 196 in the same manner that the blower of the FIGS. 9–13 embodiment is connected. A second bellows 224 is adapted to be operated by the lower piston rod (not shown). When the piston rods move downwardly the lower bellows 224 will be expanded to generate a high impulse vacuum. The vacuum will be communicated through ejector vacuum port 226, the exhaust check valve 228 during this movement being closed. At the commencement of operation, air would be introduced into the air cylinder 174 through a suitable port 230 to cause the piston rods to move downwardly from their up position shown in FIG. 15B to their lower position shown in FIG. 15A. This operation should take place in ¹/₁₀ of a second. During this operation the check valve 220 would open permitting air to flow within the upper bellow 210, and the lower check valve would be closed to create a high vacuum in line 226. When this operation has been completed, the second action takes place following a time delay of approximately ¹/₁₀'s of a second. Thus, air would then be introduced into port 232 of cylinder 174 to move the bellows 210 and 224 from the FIG. 15A position to the FIG. 15B position.

The high volume low pressure bellows 210 would collapse forcing high volume air to be sent to the ejector transfer port 222, while the vacuum chamber 224 is resetting. When using pneumatic or hydraulic power as a prime mover, this system would be activated by a timing switch with an adjustable dwell function to set the delay. The timing switch would activate a pilot operated solenoid valve which in turn would control movement of the impulse and air generator. The timing is coordinated by the timing shaft so that vacuum impulse air is created when the tray has become stationary with individual cells positioned over suitable apertures.

THE INDEXING MEANS

As previously noted a first indexing mechanism is provided to control longitudinal movement of the grid bearing plate, and a second indexing mechanism is provided to control transverse movement of the grid trays. For convenience, the first indexing mechanism will be referred to as the "X" movement indexer, and the second indexing mechanism will be referred to as the "Y" movement indexer. The "X" indexer is best illustrated in FIGS. 7, 8A, 8B, and 9. The "X" and "Y" indexers are both driven by a timing shaft 248. To this end, it should be noted that each of the ground engaging wheels 12L and 12R are connected through a sprocket and chain 240, 242, to cause a cross shaft 246 to be rotated, the rotational speed of the cross shaft being proportional to the forward movement of the transplanter of this invention. The cross shaft also drives each of the ground units for mulch cover beds, if the transplanter is equipped with the row units shown in FIGS. 3 and 4. The cross shaft 246 in turn drives a timing shaft 248 through sprockets and chain (not shown) at a speed selected by the operator to properly establish plant spacings.

The "X" indexer includes an eccentric 252 mounted on timing shaft 248, the eccentric 252 in turn being connected to a push-pull linkage 254 which has its upper end secured to a pivoted lever 256 which in turn carries a pawl 258 which engages a ratchet 260. It can be seen from an inspection of FIG. 8B that one revolution of the timing shaft 248 will cause the ratchet to rotate ½₀ of a complete revolution. The ratchet in turn causes an ejector positioning cam 262 (FIG. 9) to be rotated with it. A cam follower 264 rides in cam track 266. The cam follower 264 is in turn carried by a slidable rod 268, which rod slides in bearings 270 rigidly mounted on sub frame 280 of the transplanter. The rod 268 is in turn secured through a suitable journal block 271 to an intermediate portion of a suitable link 272. The lower end of the link 272 is secured to a lower fore-and-aft extending link 274 which is in turn secured to the frame 280 of the transplanter. The upper end of the pivotal link 272 is in turn secured to a fore-and-aft extending upper link 276 which is in turn connected via an L-shaped bracket to the slidable plant tray bearing plate 22. The plant tray bearing plate is in turn supported for fore-and-aft sliding movement upon stationary frame members 280 of the transplanter. While the slidable plant tray bearing plate 22 will be caused to be moved forwardly and backwardly in the direction of the "X" arrow in FIG. 9, it should be noted that the tray 14 is restrained from movement in the "X" direction by guide rails 32, 33, best shown in FIG. 7. As can be seen from FIG. 1, the cam 262 is disposed to the left side of the bearing plate 22. This will prevent the mechanism for moving the plate 22 in the "X" direction from interfering with the drop tubes 26 which are carried by the plate 22. Also it will prevent the "X" movement mechanism from interfering with the vacuum line 190, air line 196, and plant transfer tube 160, and other components of the plant ejector system which is carried by the plate 22.

Figure 16:
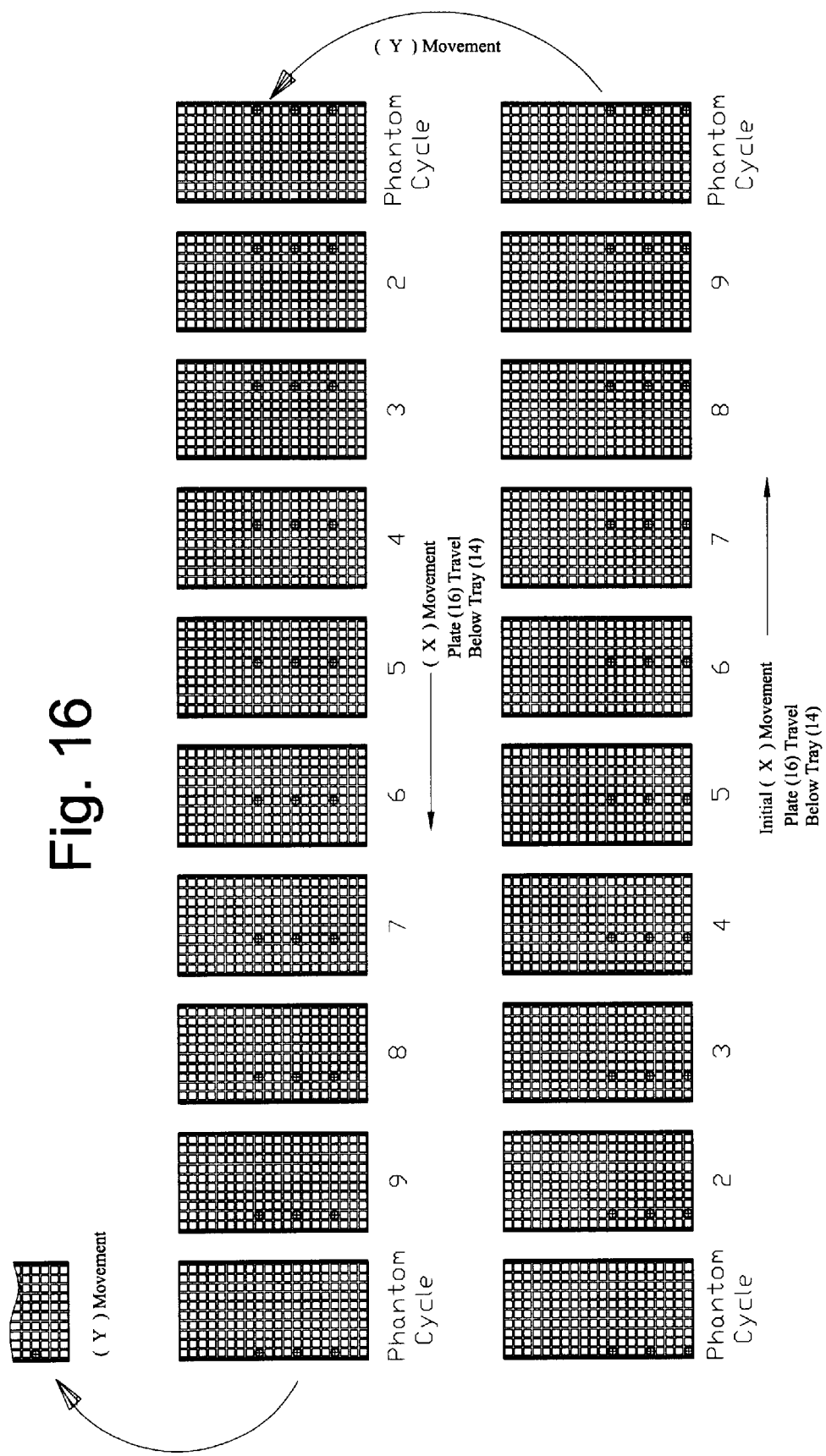
FIG. 16 is a schematic view illustrating a sequence of plant ejections from a plant carrying tray.

As can be seen from FIG. 16, each of the plant trays has 20 rows of plant cells in 10 columns. In operation 10 cells (i.e. all the cells in a row), are extracted in a sequential movement for each of the spaced apart drop tubes 26 as the table 22 moves in an "X" movement horizontally away from the cam 262 as can be seen from the bottom series of positions shown in FIG. 16 as the trays move from the left to the right. After each row associated with each drop tube has been extracted, the plant tray will then be moved in a "Y" direction (up in FIG. 16), which "Y" direction is shown by the arrow in FIG. 1. After the "Y" movement, a second set of rows are positioned over the drop tubes, and another 10 cells are extracted for each drop tube as the table moves back towards the cam as can be seen from the upper side of FIG. 16. The cam is so designed that there are opposed dwell periods or phantom cycles at the end of 180° of angular rotation of the cam for repositioning the table in a "Y" direction for the next "X" cycle of extractions.

Figure 7:
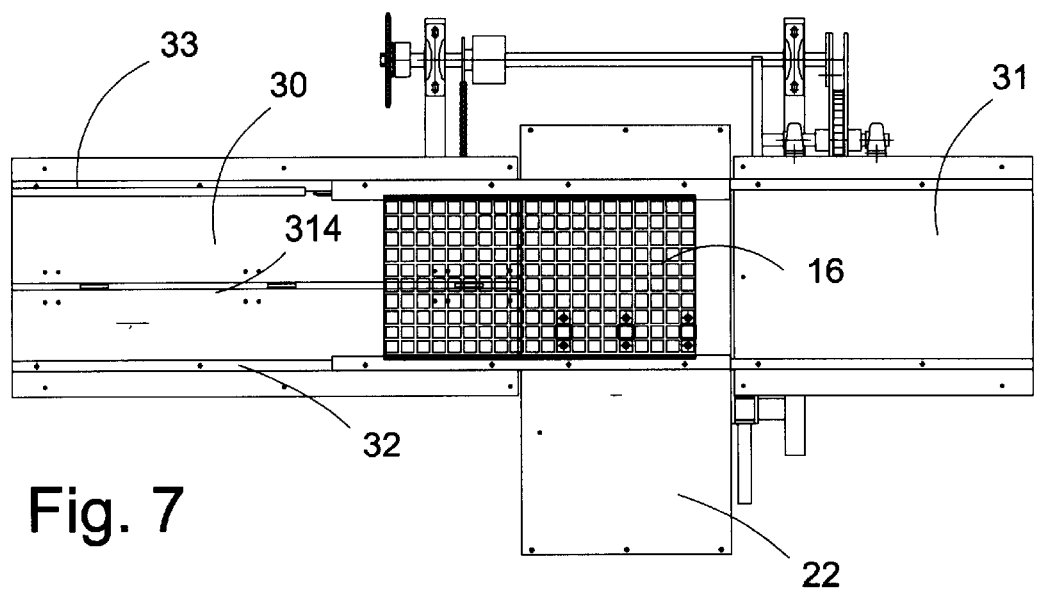
FIG. 7 is a top view of a seedling tray support assembly, this view being from the front and including the seedling tray.
Figure 7A:
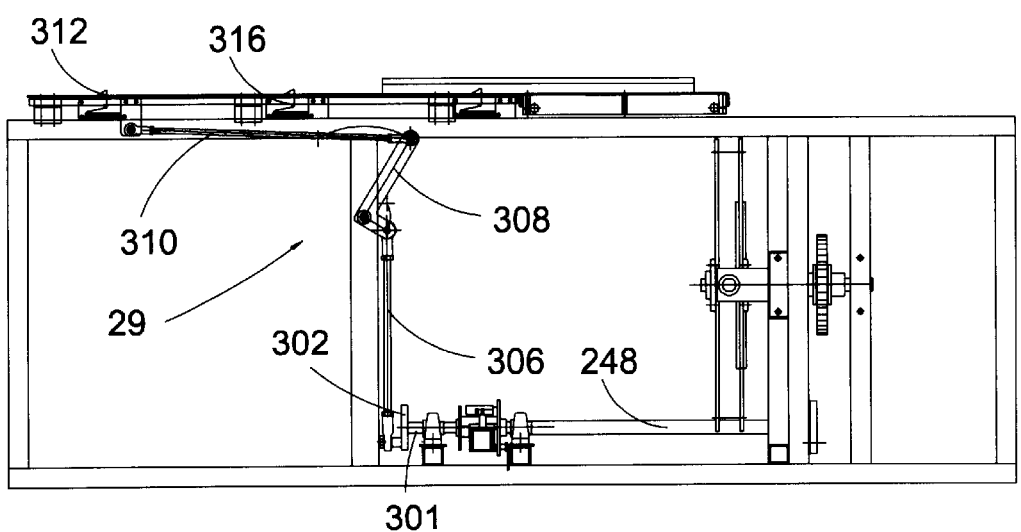
FIG. 7A is a side view taken from the front of the structure shown in FIG. 7.
Figure 7B:
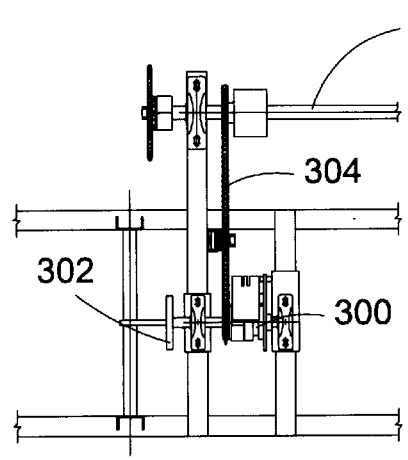
FIG. 7B is a partial top view of the structure shown in FIG. 7A, but with the tables removed.

The mechanism for imparting a "Y" movement to the trays 14 is best illustrated in FIGS. 7, 7A, and 7B. A "Y" direction of movement will be imparted to each tray after an entire set of rows have emptied of their seedlings, which rows are in alignment with the drop tubes 26 carried by the table 22. At this point the cam 262 will go into a dwell or phantom position when it is ratcheted causing no "X" movement. During the phantom cycle of "X", rotation of the cam will cause a micro-switch (not shown) will be triggered by one of two triggers carried by the back side of the cam, which triggers are spaced 180° apart from the axis of the cam. "Y" movement is initiates when the micro-switch is activated by rotation of the cam 262, which micro-switch in turn activates a single revolution clutch 300 which is coupled to the timing shaft 248 by a sprocket and chain 304. The single revolution clutch 300 is in turn connected to a further shaft 301. An eccentric 302 is carried by the shaft 301, which eccentric in turn converts rotary motion into linear movement by means of connecting linkage 306, bell crank 308, and a generally horizontal link 310 which has one end connected to one end of the bell crank and the other end connected to an infeed rail assembly 312. The infeed rail assembly is carried by a track 314 in the right support table 30, which is shown to the left in FIG. 7. The infeed rail assembly in turn carries a number of spring biased pivoted pawls 316 which, when the rail is moving to the right (to the left in FIG. 7) will slide under the various cells within a plant tray 14, but when being moved to the left (to the right in FIG. 7) will engage the cells and move the tray 14 in the "Y" direction.

Figures 8A, 8B:
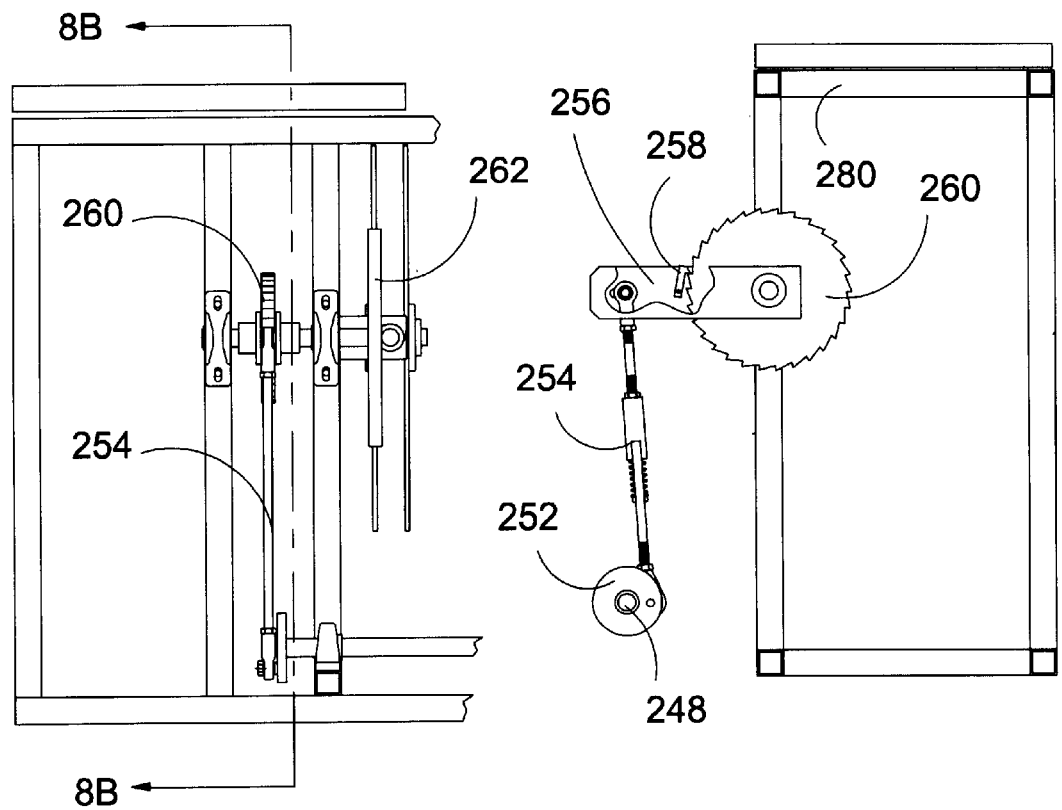
FIG. 8A is an elevational view showing a portion of the structure shown in FIG. 8 partially illustrating the mechanisms used to impart an "X" movement to the seedling tray support.
FIG. 8B is a sectional view taken generally along the line 8B—8B in FIG. 8A.
Figure 8:
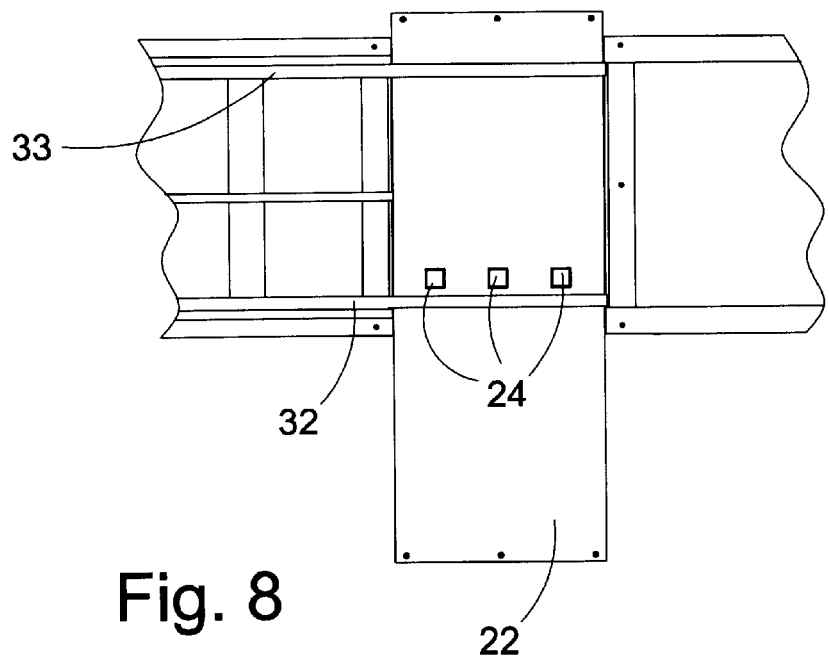
FIG. 8 is a view similar to FIG. 7, but with the plant tray not being shown.

As can be seen from FIGS. 8, 9, and 16, the cross table 22 is provided with three apertures 24, each of which is associated with a drop tube 26. These apertures are spaced apart a distance equal to the distance of the width of 4 cells. When a "Y" movement is imparted to the tray 14, it is moved a distance equal to the width of three cells. Thus, on start-up, the first, fifth, and ninth rows of cells will be planted during a 180° revolution of the cam 262. At the completion of this cycle and during the "X" phantom cycle, the tray 14 is then indexed in a "Y" direction a distance equal to the width of three cells. After this "Y" movement, the forth, eighth, and twelfth rows will be emptied during the next 180° of rotation of the cam. After the next "Y" movement, rows 7, 11, and 15 will be emptied. After the next "Y" movement, rows 10, 14, and 18 will be emptied. After the next "Y" movement, rows 13 and 17 will be emptied, and the first row of the next adjacent tray will also be emptied, the rows of the adjacent tray having a b suffix. After the next "Y" movement, rows 16, 20 and 4b will be emptied.

Subsequent "Y" movement will empty rows 19, 3b, and 7b; then rows 2b, 6b, and 10b; and then rows 2b, 6b, and 10b; and so on. It can be seen that the first tray to pass over the plate 22 will not have all rows emptied, as rows 2, 3, and 6 will not be emptied. However, subsequent adjacent trays will have all rows emptied.

PLANT SPACING SYSTEM

The plant discharge is sequenced to deliver the plant during the reloading phase of the ground engaging unit. Transferring transplant by pneumatics down a tube tends to be inconsistent in travel speed and velocity. If transports were dropped directly into the soil, in-row plant spacing would vary as to the speed of each individual plant. To overcome the erratic plant travel speed, transplants are ejected from the indexer and received in a holding area of the row unit.

In the bare ground unit shown in FIG. 2, the tube 70 is provided with a solenoid operated valve mechanism near its bottom, which valve mechanism can be moved between open and closed positions. When in the closed position, the valve will retain a seedling within the tube 70. However, when the valve is opened the seedling may drop via gravity and low pressure air into the ground.

In the unit for mulch covered rows shown in FIGS. 3 and 4 the seedling is received initially by closed clam shell jaws 102, 104 which are in their raised position as illustrated in the center of FIG. 3, where they are spaced above the press wheels 106, 108. When it is desired to plant the seedlings, the jaws 102, 104 will be moved downwardly into the ground, will then be opened, and then raised again.

The valve in the tube 70, or the jaws 102, 104 are timed to open during either "X" or "Y" movement. To this end it should be noted that either "X" or "Y" movement is initiated by the rotation of timing shaft 248. The timing is as follows: During the first 180° of rotation of the timing shaft a pawl will cause movement. Thus during "X" movement, pawl 258 will cause the plant tray bearing plate 22 to be moved an "X" increment. Similarly, during a first 180° of rotation of the shaft 248, the pawls 316 will engage the tray and move it in the "Y" direction. In either case, it is the same 180° of rotation which accomplished the movement. At the completion of the 180°, and during the next 20° of rotation, the plants will be extracted from their cells, and moved towards either the valve in tube 70 or to the jaws. The valve will be retained in its closed position, or the jaws will be retained in their closed position for a suitable length of time after plant extraction to insure that the seedlings have been received by the valve or jaws. Thus, approximately 180° of time is allocated for the row unit to receive the transplant. The transplant is targeted to be received in the middle of the 180° of time allocated for the row unit. This action allows the transplant to speed up or slow down 90° and still be received and planted properly.

ALTERNATIVE ROW CONFIGURATIONS

Figure 17A:
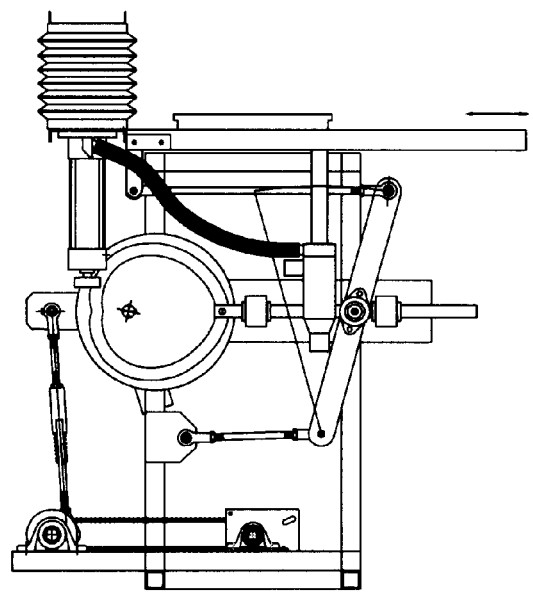
Figure 17B:
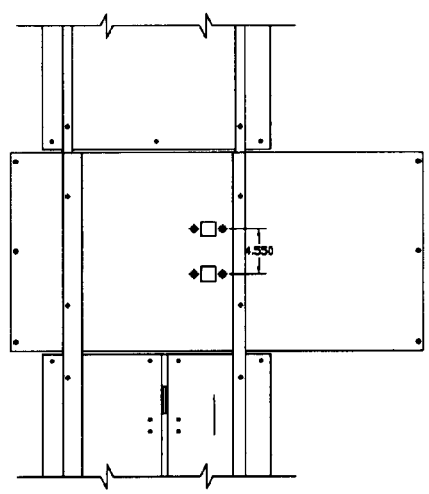

While the present invention has been described in connection with three row transplanters, other row configurations may be employed. Thus, a two row version is illustrated in FIGS. 17A and 17B. In this design, the plate 22 is provided with two apertures and associated drop tubes, the apertures being spaced three cells apart. "Y" indexing will be two cells at a time.

A four row version is illustrated in FIGS. 18A and 18B. In this design the plate is provided with 4 apertures spaced apart a distance equal to the distance of 5 cells, the cells extending transversely across the plate. "X" movement will be one row at a time, and "Y" movement will be a distance equal to four cells at a time.

It can be seen from an inspection of the three row system fully illustrated in FIGS. 1–16, as well as from an inspection of the 2 and 4 row systems shown in FIGS. 17A to 18B that the apertures are spaced apart a distance equal to the width of the cells equal to the number of rows, i.e., (n plus 1) times the width of the cells, when n equals the number of rows to be planted. In addition, it can also be seen that the support is indexed a "Y" distance equal to n.

An alternate four row version is illustrated in FIGS. 19A and 19B. In this design, the plate 22 is provided with two pairs of two transversely spaced apart apertures and associated drop tubes, the apertures in each transversely spaced apart pair being spaced three cells apart, and the two pairs are spaced approximately 5 cells apart. A differing cam will be employed, the cam being similar to cam 262, but providing 5 "X" steps, rather than 10 as in the three row design. "Y" indexing will be two cells at a time.

Figure 21A:
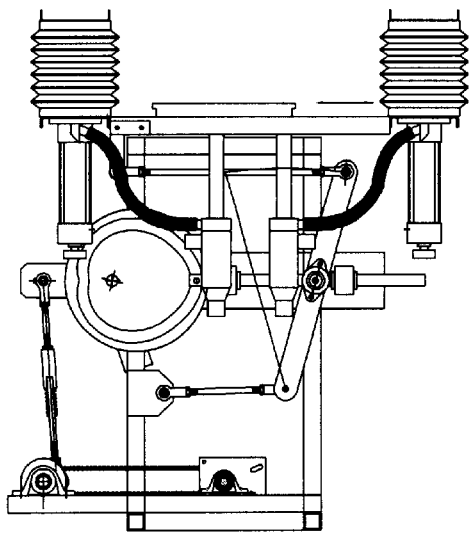
Figure 20A:
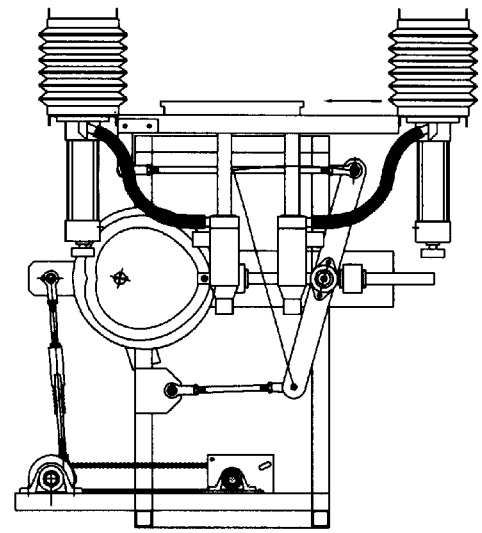
Figure 21B:
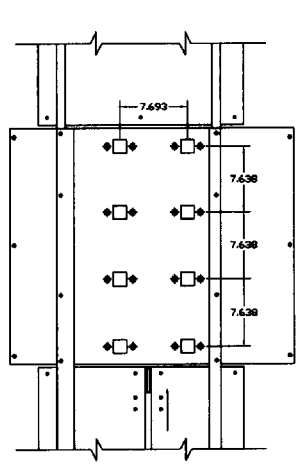
Figure 20B:
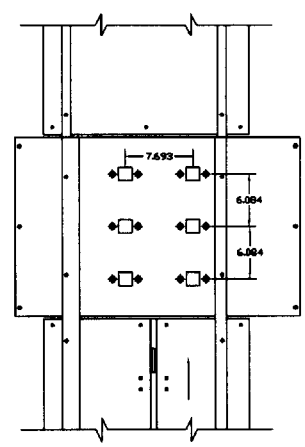

An six row design in shown in FIGS. 20A and 20B, and an eight row design is shown in FIGS. 21A and 21B. Its operation is essentially the same as the alternate four row version, with the spacing between apertures in the same row being equal to 5 cells.

Finally, five and 10 row designs are shown in FIGS. 22A–23B. In the five row design of FIGS. 22A–22B the trays are not moved in an "X" direction, the support plate being stationary. Thus, the support plate is provided with a staggered array of five apertures which are offset one row with respect to each other. The distance between the cells as illustrated is equal to three cells. After a tray (other than the first tray) has passed over the stationary plate shown in FIGS. 22A and 22B, it will have had one side emptied. It will then be necessary to turn the tray around 180° and again feed it across the table in order to remove all seedlings. In the ten row design, any tray other than the first will have all seedlings removed as can be appreciated from a review of the design shown in FIGS. 23A and 23B.

While preferred forms of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, it should be noted that while the term ground is used exclusively in the claims, it should be interpreted in such a manner as to include ground within pots, trays, and the like. While specific designs are shown for indexing the trays, which designs includes ratchets, pawls, and cams, it should be appreciated that other means may be employed such as stepping motors, feedback controlled cylinders, etc. In addition, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A method of transplanting a plurality of seedlings simultaneously from an open bottom plant tray having a plurality of seedling receiving cells, the seedlings being transplanted to a plurality of transversely spaced apart rows in the ground; comprising the following:

providing an open bottom plant tray having a plurality of seedling receiving cells with seedlings therein;

providing a carrier which may be moved forwardly over the ground;

providing a plurality of transversely spaced apart soil openers, one for every row which is to be planted, the soil openers creating seedling receiving openings in the ground;

providing a support on the carrier for the open bottom seedling carrying plant tray, the support having a plurality of spaced apart openings, one for every row which is to be planted;

indexing the open bottom plant tray relative to the support to cause a number of seedling containing cells in the plant tray to be placed over the spaced apart openings; and transporting the seedlings from said number of cells to the seedling receiving openings to simultaneously transplant a number of seedlings from a single tray to a number of spaced apart rows.

2. The method of transplanting a plurality of seedlings as set forth in claim 1 wherein, if n rows are to be planted, the spaced apart openings are spaced apart a distance equal to (n plus one) times the width of the cells, and wherein the open bottom plant tray is indexed relative to the support a distance equal to n times the width of the cells.

3. The method of transplanting a plurality of seedlings as set forth in claim 1 further comprising the additional steps of providing a tubular passageway for each of the plurality of rows, each passageway including an intermediate ejector chamber;

simultaneously applying a vacuum to each of the plurality of seedlings which are to be transplanted to cause them to be withdrawn from the open bottom plant tray and be transported to the intermediate chamber, one seedling being received within an intermediate chamber of each tubular passageway; and then applying a positive pressure to each seedling within the intermediate injection chamber to cause it to be transported from the intermediate injection chamber to the associated row, whereby at least two seedlings from a common open bottom plant tray are simultaneously planted in at least two rows.

4. The method of transplanting a plurality of seedlings as set forth in claim 3 wherein the support on the carrier is a longitudinally movable cross table having a plurality transversely spaced apart apertures corresponding to the number of rows to be planted, a tubular passageway being associated with each of the plurality of apertures; and wherein the open bottom plant tray is supported upon the movable cross table in such a way that the table can move longitudinally without causing corresponding movement of the open bottom plant tray; and further comprising the additional steps of applying a vacuum to a plurality of seedlings to cause the seedling to be transported to the ejector chambers; and either moving the table longitudinally or moving the open bottom plant tray transversely while the positive pressure is being applied to the seedlings to position the next plurality of seedlings in their proper position for planting.

5. An apparatus for transplanting a plurality of seedlings simultaneously from an open bottom plant tray having a plurality of seedling receiving cells, the seedlings being transplanted from a centralized location to a plurality of transversely spaced apart rows in the ground; comprising the following:

an open bottom plant tray having a plurality of seedling receiving cells with seedlings therein;

a carrier which may be moved forwardly over the ground;

a plurality of transversely spaced apart soil openers, one for every row which is to be planted, the soil openers creating seedling receiving openings in the ground;

support on the carrier for the open bottom seedling carrying plant tray, the support having a plurality of spaced apart openings, one for every row which is to be planted;

means for indexing the open bottom plant tray relative to the support to cause a number of seedling containing cells in the plant tray to be placed over the spaced apart openings; and means for transporting the seedlings from said number of cells to the seedling receiving openings to simultaneously transplant a number of seedlings from a single tray to a number of spaced apart rows.

6. The apparatus for transplanting a plurality of seedlings as set forth in claim 5 wherein the means for transporting the seedlings comprises:

a tubular passageway extending from each of the opening to a location adjacent the ground, the passageway including an intermediate ejector chamber;

an impulse generator for creating a negative impulse vacuum in a portion of the tubular passageway adjacent the opening sufficient to cause seedlings to be pulled from the open bottom tray; and a source of positive air which is applied to the intermediate ejector chamber which acts to push the seedling down each of the tubular passageways towards the ground.

7. The apparatus for transplanting a plurality of seedlings as set forth in claim 6 wherein the intermediate ejector chamber is provided with a birds mouth valve, the impulse generator being connected to the ejector chamber above the valve, and the source of positive air being connected below the valve.

8. The apparatus as set forth in claim 6 wherein the impulse generator is a cylinder operated bellows.

9. The apparatus as set forth in claim 8 wherein negative impulse vacuum created by an air cylinder operated bellows cycles from atmospheric pressure to full vacuum of about 30" of mercury and back to atmospheric in about 0.1 seconds.

10. The apparatus for transplanting a plurality of seedlings as set forth in claim 6 wherein the impulse generator and source of positive air are spaced apart bellows, and wherein a common cylinder having opposed rods is connected to and operates both bellows.

11. An apparatus for transplanting a seedling from an open bottom seedling containing tray to the ground, said apparatus comprising:

a tubular passageway extending from the open bottom seedling tray to a location adjacent the ground, the passageway including an intermediate ejector chamber;

an impulse generator for creating a negative impulse vacuum in a portion of the tubular passageway adjacent the open bottom seedling tray sufficient to cause a seedling to be pulled from the open bottom tray; and a source of positive air which is applied to the intermediate ejector chamber which acts to push the seedling down the tubular passageway towards the ground.

* * * * *